United States Patent
Ohtaki et al.

(10) Patent No.: US 9,139,679 B2
(45) Date of Patent: Sep. 22, 2015

(54) THERMOPLASTIC ELASTOMER COMPOSITION AND PROCESS FOR MANUFACTURING THE SAME

(71) Applicants: MITSUBISHI CHEMICAL CORPORATION, Chiyoda-ku (JP); CCTEC/CORNELL UNIVERSITY, Ithaca, NY (US)

(72) Inventors: Hisashi Ohtaki, Kanagawa (JP); Fumihiko Shimizu, Kanagawa (JP); Geoffrey W. Coates, Lansing, NY (US); Glenn H. Fredrickson, Santa Barbara, CA (US)

(73) Assignees: MITSUBISHI CHEMICAL CORPORATION, Chiyoda-ku (JP); CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/260,794

(22) Filed: Apr. 24, 2014

(65) Prior Publication Data

US 2015/0057415 A1    Feb. 26, 2015

Related U.S. Application Data

(63) Continuation of application No. PCT/JP2012/077375, filed on Oct. 23, 2012.

(30) Foreign Application Priority Data

Oct. 24, 2011   (JP) .................................. 2011-233247

(51) Int. Cl.
| | |
|---|---|
| C08F 8/00 | (2006.01) |
| C08F 255/10 | (2006.01) |
| C08F 4/64 | (2006.01) |
| C08F 293/00 | (2006.01) |
| C08F 210/16 | (2006.01) |
| C08F 255/00 | (2006.01) |

(52) U.S. Cl.
CPC ................. C08F 293/00 (2013.01); C08F 4/64 (2013.01); C08F 210/16 (2013.01); C08F 255/00 (2013.01)

(58) Field of Classification Search
CPC ........ C08F 210/16; C08F 4/64; C08F 255/00; C08F 293/00; C08F 210/06; C08F 2500/15; C08F 2500/16; C08F 210/14
USPC .................................................. 525/191, 240
See application file for complete search history.

(56) References Cited

U.S. PATENT DOCUMENTS

| | | | |
|---|---|---|---|
| 5,756,575 A * | 5/1998 | Kawasaki et al. ............. | 524/525 |
| 6,147,180 A | 11/2000 | Markel et al. | |
| 6,184,327 B1 | 2/2001 | Weng et al. | |
| 6,197,910 B1 | 3/2001 | Weng et al. | |
| 6,573,352 B1 | 6/2003 | Tatsumi et al. | |
| 6,777,498 B2 * | 8/2004 | Imai et al. ..................... | 525/191 |
| 6,897,261 B1 | 5/2005 | Machida et al. | |
| 7,235,609 B2 * | 6/2007 | Dharia et al. ................. | 525/240 |
| 8,354,468 B2 * | 1/2013 | Toyoda et al. ................ | 524/525 |
| 2003/0208024 A1 | 11/2003 | Tatsumi et al. | |
| 2009/0318644 A1 | 12/2009 | Brant et al. | |
| 2010/0168323 A1 | 7/2010 | Ito et al. | |
| 2011/0046290 A1 | 2/2011 | Toyoda et al. | |

FOREIGN PATENT DOCUMENTS

| | | |
|---|---|---|
| CN | 1259147 A | 7/2000 |
| CN | 1274373 A | 11/2000 |
| JP | 11-199641 | 7/1999 |
| JP | 2001-525460 | 12/2001 |
| JP | 2001-525463 | 12/2001 |
| JP | 2001-527589 | 12/2001 |
| JP | 2009-299045 | 12/2009 |
| JP | 2011-525212 | 9/2011 |
| WO | 99/29749 | 6/1999 |
| WO | 01/07493 | 2/2001 |
| WO | 2008/059969 | 7/2010 |

OTHER PUBLICATIONS

International Search Report issued Jan. 8, 2013 in PCT/JP2012/077375 filed Oct. 23, 2012.
Chinese Office Action issued on Apr. 28, 2015 in corresponding Chinese Patent Application No. 201280052306 w/English translation.
Extended European Search Report issued Jun. 29, 2015 in corresponding European Patent Application No. 12844622.6.
Atsushi Hotta, et al., "Semicrystalline Thermoplastic Elastomeric Polyolefins: Advances Through Catalyst Development and Macromolecular Design", National Academy of Sciences, 2006, 103(42), 15327-15332.

* cited by examiner

*Primary Examiner* — Nathan M Nutter
(74) *Attorney, Agent, or Firm* — Oblon, McClelland, Maier & Neustadt, L.L.P.

(57) ABSTRACT

The present invention relates to a thermoplastic elastomer composition which comprises a branched olefin copolymer comprising: a main chain of an ethylene/α-olefin copolymer; and a side chain derived from a crystalline propylene polymer containing a vinyl group at one end, wherein the content of α-olefin in the main chain is 70 mol % or less, the composition has an elongation at break of 500% or higher, and has an elastic recovery rate of 70% or more when recovering from an extension to 300% elongation, and a process for manufacturing the same.

17 Claims, 1 Drawing Sheet

THERMOPLASTIC ELASTOMER COMPOSITION AND PROCESS FOR MANUFACTURING THE SAME

TECHNICAL FIELD

The present invention relates to a thermoplastic elastomer composition which comprises a branched olefin copolymer comprising a main chain of an ethylene/α-olefin copolymer and a side chain derived from a crystalline propylene polymer containing a vinyl group at one end.

BACKGROUND ART

A thermoplastic elastomer means an elastomer which is softened to have flowability upon heating and has rubber elasticity upon cooling. Specifically, at the time when an elastomer is molded, it melts at a processing temperature and it becomes possible to mold it easily by a well-known method to be used for resin molding. However, at a temperature at which it is actually used as various materials (hereinafter referred to as "use temperature"), it is an industrially extremely useful material having physical properties similar to a crosslinked rubber.

Heretofore, as thermoplastic elastomers, polymers such as block copolymers, particularly various multiblock copolymers, e.g., triblock copolymers and the like, have been known.

In general, the aforementioned block copolymer has a structure in which a "soft segment" having amorphous or rubbery physical properties and a "hard segment" that is in a crystalline or glass state at a typical use temperature of a thermoplastic elastomer. Polymer chains in the hard segment may bind to one another at the typical use temperature to exhibit properties as an elastomer. However, when it is heated at a temperature higher than the melting temperature (hereinafter also abbreviated as "Tm") of the hard segment or the glass transition temperature (hereinafter also abbreviated as "Tg") of the hard segment, the polymer easily exhibits a thermoplastic behavior.

The use temperature of a thermoplastic elastomer is typically at around room temperature, for example in the range of 10° C. to 40° C. but, depending on use environments and use applications, it is expected to use it at a lower temperature (e.g., 0° C. or lower) or at a higher temperature (e.g., 50° C. or higher), so that heat resistance is sometimes required. In that case, thermal properties of the hard segment become important.

As thermoplastic elastomer (TPE) compositions, styrene-based block copolymers (SBC) may be mentioned as well-known ones, and examples thereof include linear triblock copolymers such as a styrene-isoprene-styrene triclock copolymer and a styrene-butadiene-styrene triblock copolymer.

These copolymers have a well-controlled block structure and the styrene segment has relatively high Tg, so that it is known that they exhibit a relatively excellent balance between heat resistance and elastomer properties. However, since these styrene-based block copolymers are usually manufactured by successive anionic polymerization or chemical coupling of linear diblock copolymers, usable monomer species are limited. Moreover, each polymer chain requires a stoichiometric amount of a polymerization initiator and a polymerization rate is relatively low, so that the process is poor in economic efficiency.

Furthermore, since typical SBC's have a glass transition temperature of approximately 80 to 90° C., they again have flowability and are poor in heat resistance at a higher use temperature, so that use of these copolymers is limited.

In order to remedy the defects of these conventional technologies, it is particularly desired, from the viewpoints of efficiency of the process and economical efficiency of raw materials, to form these block copolymers or thermoplastic elastomer compositions by insertion or coordination polymerization of olefin monomers using a transition metal compound, so that it is investigated to improve the physical properties by olefin-based block copolymers, specifically propylene-based block copolymers.

In Non-Patent Document 1, mechanical properties of these propylene-based block copolymers are precisely evaluated. According to the evaluation, Tm of the propylene segment is high as compared to Tg of the polystyrene segment in the aforementioned styrene-based block copolymers and thereby, especially under a high temperature, the propylene-based block copolymers have higher elastomer properties as compared to the styrene-based block copolymers. However, at the manufacture of these propylene-based block copolymers, a living polymerization catalyst is used. With the living polymerization catalyst, only one polymer chain is theoretically obtained from one catalyst molecule and thus productivity is limited, so that the use applications are limited to relatively-small-amount and high-added-value fields.

Accordingly, there has been investigated a process for producing a "block-like copolymer" by a method exhibiting more excellent productivity. There has been investigated a process for forming a graft copolymer having different properties in the side chain and in the main chain by copolymerizing a polymer having a vinyl group capable of coordination polymerization at one end and a monomer, as a specific "block-like copolymer".

Patent Document 1 discloses an olefin-based thermoplastic elastomer composition having specific physical properties, which contains a branched olefin copolymer in which a polymerizable macromonomer is copolymerized in the soft segment, and a process for manufacturing the same.

Patent Document 2 discloses a thermoplastic elastomer composition containing a branched olefin polymer having an isotactic polypropylene segment as a crystalline side chain and having an atactic polypropylene as a non-crystalline main chain, and a process for manufacturing the same.

Patent Document 3 discloses a composition containing a branched propylene copolymer having an isotactic polypropylene segment in the side chain and having a propylene/ethylene copolymer in the main chain.

PRIOR ART DOCUMENTS

Patent Documents

Patent Document 1: JP-T-2001-527589 (the term "JP-T" as used herein means a published Japanese translation of a PCT patent application)
Patent Document 2: JP-T-2001-525463
Patent Document 3: WO2008/059969

Non-Patent Document

Non-Patent Document 1: Proceedings of the National Academy of Science (2006) vol. 103 (42) pp. 15327

SUMMARY OF THE INVENTION

Problems that the Invention is to Solve

However, in the branched olefin copolymer described in Patent Document 1, Tm of the side chain is high as compared to Tg of SBC but is low as compared to a crystalline polypropylene and thus the heat resistance of the copolymer cannot be said to be sufficient yet. Also, the elastomer composition disclosed in Patent Document 1 is found to be obviously insufficient in elastomer physical properties when the present inventors have conducted follow-up study. The branched olefin copolymer described in the document has an ethylene copolymer as the main chain and an ethylene homopolymer as the side chain. In an ethylene-based polymer side chain, crystallization of the side chains themselves is possible but sliding of the side chains one another is prone to occur and thus the function as a physical crosslinking point is insufficient, so that it is considered that the polymer has poor mechanical properties as an elastomer.

Moreover, in the branched olefin polymer described in Patent Document 2, an atactic polypropylene is used as the main chain part. However, the glass transition point of the atactic polypropylene is generally high and is known to be about 0° C., so that embrittlement at a low temperature is significant and it is impossible to expect an effect of improving low-temperature impact resistance by the addition to a crystalline resin, which is typical as a use application of a thermoplastic elastomer. Furthermore, the atactic polypropylene is generally known to have extremely high compatibility with an isotactic polypropylene and, in the case where the atactic polypropylene is added to a crystalline polypropylene matrix, the atactic polypropylene changes the structure of the matrix itself and deteriorates mechanical properties such as rigidity. Moreover, since affinity between the main chain and the side chain is high, interaction between the side chains cannot be sufficiently achieved and thus it cannot be said that the mechanical properties as an elastomer are sufficient.

The invention described in Patent Document 3 relates to an improvement in flowability and an improvement in impact resistance and there is no disclosure about an elastomer. The macromonomers disclosed and actually manufactured in Patent Document 3 have high molecular weight and the ratio of crystalline propylene including the macromonomer actually not copolymerized in the branched propylene copolymer is large, so that it is obvious that it is not intended to achieve performance as an elastomer.

In consideration of the above problems, an object of the present invention is to provide an olefin-based thermoplastic elastomer which has excellent performance as a thermoplastic elastomer, such as heat resistance and mechanical properties and is capable of being manufactured by a method excellent in economical efficiency.

Means for Solving the Problems

As a result of extensive studies for solving the above problems, the present inventors have found that a composition containing an ethylene-based copolymer having a highly crystalline polypropylene segment as the side chain has extremely high performance as a thermoplastic elastomer.

Surprisingly, the thermoplastic elastomer composition of the invention having a highly crystalline polypropylene segment as the side chain exhibits excellent elastomer properties even when the content of the side chain component (component derived from a crystalline propylene polymer containing a vinyl group at one end) that forms a hard segment is relatively low, as compared to thermoplastic elastomers derived from linear or branched olefin copolymers according to the conventional technologies, particularly is also excellent in elastic recovery rate although the composition is very soft. It is considered that this is because the highly crystalline polypropylene side chain exhibits particularly excellent action as a physical crosslinking point. Thus, the thermoplastic elastomer composition is disclosed herein as one exhibiting specific and excellent properties resulting from the combination of the highly crystalline polypropylene side chain and the ethylene-based copolymer main chain.

Namely, the gist of the invention lies in the following.

(1) A thermoplastic elastomer composition which comprises a branched olefin copolymer comprising: a main chain of an ethylene/α-olefin copolymer; and a side chain derived from a crystalline propylene polymer containing a vinyl group at one end, wherein the content of α-olefin in the main chain is 70 mol % or less, the composition has an elongation at break of 500% or higher, and has an elastic recovery rate of 70% or more when recovering from an extension to 300% elongation.

(2) The thermoplastic elastomer composition according to the item (1) above, wherein the crystalline propylene polymer has an isotactic pentad ratio of 0.80 or higher.

(3) The thermoplastic elastomer composition according to the item (1) above, wherein the crystalline propylene polymer has a syndiotactic pentad ratio of 0.60 or higher.

(4) The thermoplastic elastomer composition according to any one of the items (1) to (3) above, wherein the crystalline propylene polymer has a number-average molecular weight of 50,000 or less.

(5) The thermoplastic elastomer composition according to any one of the items (1) to (4) above, which has a glass transition point of −30° C. or lower.

(6) The thermoplastic elastomer composition according to any one of the items (1) to (5) above, which has a density of 0.880 g/ml or less.

(7) The thermoplastic elastomer composition according to the item (1) above, wherein
A) the crystalline propylene polymer has an isotactic pentad ratio of 0.80 or higher;
B) the crystalline propylene polymer has a number-average molecular weight of 50,000 or less;
C) the thermoplastic elastomer composition has a glass transition point of −30° C. or lower; and
D) the thermoplastic elastomer composition has a density of 0.880 g/ml or less.

(8) The thermoplastic elastomer composition according to any one of the items (2) to (7) above, wherein the crystalline propylene polymer has an isotactic pentad ratio of 0.90 or higher.

(9) The thermoplastic elastomer composition according to the item (1) above, wherein
A) the crystalline propylene polymer has a syndiotactic pentad ratio of 0.60 or higher;
B) the crystalline propylene polymer has a number-average molecular weight of 50,000 or less;
C) the thermoplastic elastomer composition has a glass transition point of −30° C. or lower; and
D) the thermoplastic elastomer composition has a density of 0.880 g/ml or less.

(10) The thermoplastic elastomer composition according to any one of the items (3) to (6) or (9) above, wherein the crystalline propylene polymer has a syndiotactic pentad ratio of 0.70 or higher.

(11) The thermoplastic elastomer composition according to any one of the items (1) to (10) above, wherein the total content of the crystalline propylene polymer and component(s) derived from the crystalline propylene polymer, is 30% by weight or less in the thermoplastic elastomer composition.

(12) A process for manufacturing a thermoplastic elastomer composition comprising a branched olefin copolymer comprising: a main chain of an ethylene/α-olefin copolymer; and a side chain derived from a crystalline propylene polymer containing a vinyl group at one end and having a number-average molecular weight of 50,000 or less, wherein the process comprises: mixing components (a) to (c) below; and coordination polymerizing the components (a) to (c) below in the presence of a transition metal catalyst so that the main chain may have the α-olefin (c) content of 5 to 70 mol %, (a) a crystalline propylene polymer containing a vinyl group at one end, and having an isotactic pentad ratio of 0.80 or higher and a number-average molecular weight of 50,000 or less, (b) ethylene, and (c) at least one kind of α-olefin having 3 to 20 carbon atoms.

(13) A process for manufacturing a thermoplastic elastomer composition comprising a branched olefin copolymer comprising: a main chain of an ethylene/α-olefin copolymer; and a side chain derived from a crystalline propylene polymer containing a vinyl group at one end and having a number-average molecular weight of 50,000 or less, wherein the process comprises: mixing components (a) to (c) below; and coordination polymerizing the components (a) to (c) below in the presence of a transition metal catalyst so that the main chain may have the α-olefin (c) content of 5 to 70 mol %, (a) a crystalline propylene polymer containing a vinyl group at one end, and having a syndiotactic pentad ratio of 0.60 or higher and a number-average molecular weight of 50,000 or less, (b) ethylene, and (c) at least one kind of α-olefin having 3 to 20 carbon atoms.

(14) The process for manufacturing a thermoplastic elastomer composition according to the item (12) or (13) above, wherein the transition metal catalyst is a complex represented by general formula (VIII):

[Chem 1]

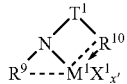

(VIII)

wherein $R^9$ is a hydrocarbon group having 1 to 30 carbon atoms, $T^1$ is a divalent group having 1 to 30 atoms excluding a hydrogen atom, $R^{10}$ is a heteroaryl group having 5 to 20 carbon atoms and having a Lewis base functionality, which may have a substituent, $M^1$ is a metal of Group 4 in the periodic table, $X^1$ is an anionic, neutral or dianionic ligand group, x' is an integer of 0 to 5 denoting the number of $X^1$ groups, $R^{10}$ and $M^1$ may bind to each other to form a ring, and the solid lines, broken lines and arrow in the formula represent a bond, an arbitrary bond and a coordinate bond, respectively.

(15) The process for manufacturing a thermoplastic elastomer composition according to any one of the items (12) to (14) above, wherein the mixing step is carried out so that the content of the component (a) is 30% by weight or less based on the total content of the components (a) to (c).

(16) The process for manufacturing a thermoplastic elastomer composition according to any one of the items (12) to (15) above, wherein the polymerization is carried out so that the total amount of the crystalline propylene polymer and component(s) derived from the crystalline propylene polymer, is 30% by weight or less in the thermoplastic elastomer composition.

(17) A thermoplastic elastomer composition manufactured by the method according to any one of the items (12) to (16) above.

Advantage of the Invention

According to the invention, it becomes possible to provide a thermoplastic elastomer excellent in mechanical properties such as heat resistance, elongation at break, and elastic recovery rate by an economical manufacturing process.

MODE FOR CARRYING OUT THE INVENTION

Figure 1:
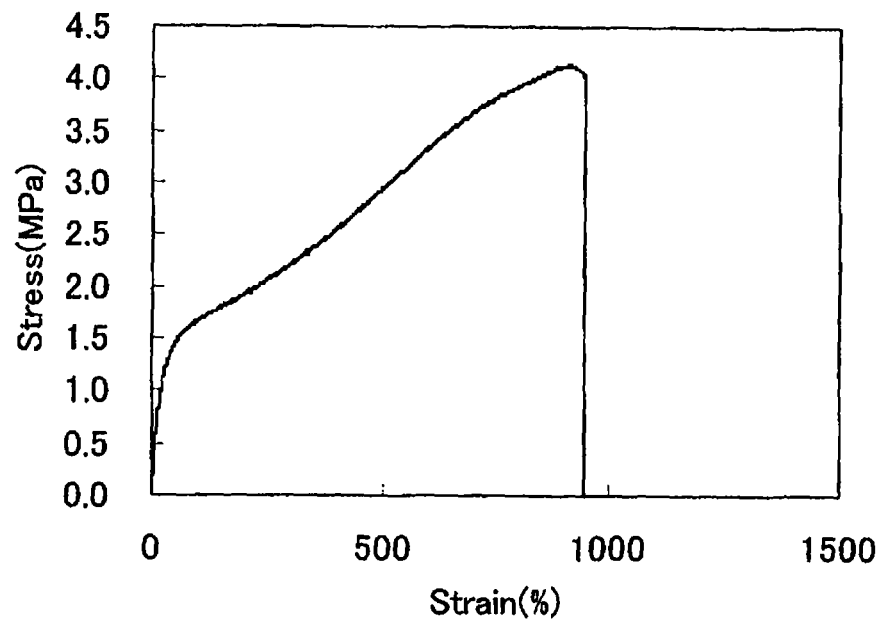
FIG. 1 is a result of measuring a stress-strain curve of Example 9.

The following will describe modes for carrying out the present invention in further detail. However, the explanation of the constituent features described below is one example of embodiments of the invention and the invention is not limited thereto and can be carried out with various modifications within the range of the gist thereof.

The thermoplastic elastomer composition of the invention (hereinafter sometimes referred to as "composition of the invention") is a thermoplastic elastomer composition which comprises a branched olefin copolymer comprising: a main chain of an ethylene/α-olefin copolymer; and a side chain derived from a crystalline propylene polymer containing a vinyl group at one end, wherein the composition has an elongation at break of 500% or higher, preferably 700% or higher, more preferably 800% or higher. When the elongation at break is less than the lower limit, the use in applications at which a high deformation rate is required is limited.

Moreover, the composition of the invention is a thermoplastic elastomer composition having an elastic recovery rate of 70% or more, preferably 75% or more when recovering from an extension to 300% elongation. In the case where the elastic recovery rate is less than the lower limit thereof when recovering from an extension to 300% elongation, performance as a general elastomer is insufficient.

Moreover, the content of α-olefin of the ethylene/α-olefin copolymer as the main chain is 70 mol % or less, preferably 60 mol % or less, more preferably 50 mol % or less. When the content is too large, compatibility between the main chain and the side chain becomes too high and it sometimes becomes difficult to form the crosslinking point between the branched olefin copolymers in which crystallization of the side chain is a key.

The composition of the invention has the above physical properties and may have any other constitution as long as it contains a branched olefin copolymer having the above main chain and side chain. Specifically, examples thereof include those having the following constitution and physical properties.

The crystalline propylene polymer from which the side chain of the branched olefin copolymer contained is derived has an isotactic pentad ratio of 0.80 or higher.

The crystalline propylene polymer from which the side chain of the branched olefin copolymer contained is derived has an isotactic pentad ratio of 0.60 or higher.

The crystalline propylene polymer from which the side chain of the branched olefin copolymer contained is derived has a number-average molecular weight of 50,000 or less.

The thermoplastic elastomer composition has a glass transition point of −30° C. or lower.

The thermoplastic elastomer composition has a density of 0.880 g/ml or less.

More preferably, there may be mentioned those having the following constitution and physical properties.

A) The crystalline propylene polymer from which the side chain of the branched olefin copolymer contained is derived has an isotactic pentad ratio of 0.80 or higher, B) the crystalline propylene polymer from which the side chain of the branched olefin copolymer contained is derived has a number-average molecular weight of 50,000 or less, C) the thermoplastic elastomer composition has a glass transition point of −30° C. or lower, and D) the thermoplastic elastomer composition has a density of 0.880 g/ml or less.

Alternatively,

A) the crystalline propylene polymer from which the side chain of the branched olefin copolymer contained is derived has a syndiotactic pentad ratio of 0.60 or higher, B) the crystalline propylene polymer from which the side chain of the branched olefin copolymer contained is derived has a number-average molecular weight of 50,000 or less, C) the thermoplastic elastomer composition has a glass transition point of −30° C. or lower, and D) the thermoplastic elastomer composition has a density of 0.880 g/ml or less.

First, the constituent features of these inventions will be described in further detail.

<Branched Olefin Copolymer>

The composition of the invention contains a branched olefin copolymer as a constituent component.

The branched olefin copolymer comprises a main chain of an ethylene/α-olefin copolymer and a side chain derived from a crystalline propylene polymer (hereinafter sometimes referred to as "crystalline polypropylene macromonomer") containing a vinyl group at one end.

The physical properties of the above branched olefin copolymer are not particularly limited but it usually has a melting point derived from the crystalline polypropylene macromonomer. Preferable values thereof are the same as preferable values of the crystalline polypropylene macromonomer but may be different from the melting point of the crystalline polypropylene macromonomer.

Moreover, the molecular weight of the branched olefin copolymer is not particularly limited but the weight-average molecular weight (Mw) is measured by GPC and is preferably 200,000 or more, more preferably 300,000. However, since the branched olefin copolymer usually exists as a mixture with an unreacted raw material and the like in the polymerization product, it is virtually impossible to isolate it and evaluate the molecular weight thereof solely. Therefore, the molecular weight is evaluated as molecular weight of the entire composition to be mentioned later.

(Main Chain: Ethylene/α-Olefin Copolymer)

The main chain of the branched olefin copolymer is an ethylene/α-olefin copolymer.

In the thermoplastic elastomer composition of the invention, the ethylene/α-olefin copolymer corresponds to a "soft segment" having amorphous or rubbery physical properties. The above main chain has usually low crystallinity, preferably non-crystallinity.

The kind of the ethylene/α-olefin copolymer to be used as the main chain is not particularly limited but specifically, it is a copolymer containing (b) ethylene and (c) at least one kind of α-olefin having 3 to 20 carbon atoms and, particularly from the viewpoints of the process, economical efficiency and physical properties, preferably a copolymer containing (b) ethylene and (c-1) at least one kind of α-olefin having 3 to 8 carbon atoms.

The content of α-olefin contained in the ethylene/α-olefin copolymer (hereinafter sometimes referred to as "comonomer content in the main chain") is usually 70 mol % or less, preferably 60 mol % or less, more preferably 50 mol %. Moreover, the lower limit is not particularly limited but the content is usually 5 mol % or more, preferably 10 mol % or more. In the case where the α-olefin content in the main chain exceeds the above upper limit, the compatibility between the main chain and the side chain becomes too high and the possibility of phase separation or co-crystallization of the side chains each other is decreased, so that the formation of the physical crosslinking point in the branched olefin copolymer chain becomes difficult in some cases. Furthermore, when the content is less than the lower limit, flexibility is poor and the copolymer is not suitable for the properties required as an elastomer in some cases.

Values of the physical properties of the ethylene/α-olefin copolymer used as the main chain in the invention are not particularly limited but the glass transition point ($T_g$) thereof is usually −30° C. or lower, preferably −50° C. or lower.

The weight-average molecular weight (Mw) of the ethylene/α-olefin copolymer is preferably 200,000 or more, more preferably 300,000 or more. Since the branched olefin copolymer contained in the composition of the invention has a branched structure, it is virtually impossible to measure the molecular weight of the part corresponding to the main chain but evaluation can be performed by subtracting the influence of the side chain from the molecular weight in the case where the ethylene/α-olefin copolymer containing no side chain derived from the crystalline polypropylene macromonomer is manufactured by the same catalyst system or the molecular weight of the actual branched olefin copolymer.

(Side Chain Derived from Crystalline Polypropylene Macromonomer)

The side chain of the branched olefin copolymer contained in the composition of the invention is derived from the crystalline propylene polymer containing a vinyl group at one end and is derived from a so-called crystalline polypropylene macromonomer. In the thermoplastic elastomer composition of the invention, it is considered that the side chain functions as a "hard segment" that is in a crystalline state or in a glass state and the composition exhibits the nature as an elastomer by binding the side chain to the main chain part that is a "soft segment" each other. Specifically, the nature as an elastomer is imparted to the composition by crystallizing the side chain between the molecules one another as a "hard segment" and crosslinking the main chain part that is a "soft segment". The crystal of polypropylene is especially rigid among other crystalline polyolefins and therefore the polypropylene side chain is considered to exhibit particularly high performance as a hard segment. Moreover, one having high stereoregularity has a high melting point and is considered to have particularly high heat resistance as compared to compositions containing SBC or a polyethylene-based hard segment.

(Crystalline Polypropylene Macromonomer)

The crystalline polypropylene macromonomer to be used in the invention is a polymer that forms the side chain in the branched olefin copolymer and is a crystalline propylene polymer containing a vinyl group at one end.

The end vinyl group of the crystalline polypropylene macromonomer means that an unsaturated bond is generated at an end by the occurrence of β-hydrogen elimination or β-methyl elimination at a terminal end of propylene polymerization and three substituents of four substituents of the generated unsaturated bond are hydrogen atoms. The end vinyl group is also called as a 1-propenyl group. Usually, it is difficult to induce insertion of unsaturated ends other than the vinyl group, for example, a vinylidene group or an internal olefin by coordination polymerization and, at the time when it is intended to copolymerize the crystalline polypropylene macromonomer by coordination polymerization, it is important that the end is a vinyl group.

A process for manufacturing the crystalline polypropylene macromonomer to be used in the invention, specifically the component (a) or component (a') to be mentioned later is not particularly limited and conventionally known processes for manufacturing a macromonomer can be appropriately used. Preferred is a process capable of manufacturing a highly crystalline polypropylene macromonomer efficiently. More specifically, preferred is a method in which the macromonomer is manufactured by coordination polymerization of propylene using a transition metal compound and the polymerization terminal end becomes a vinyl group at a high ratio, from the economical viewpoint.

For example, as a process for manufacturing the above isotactic polypropylene macromonomer, there may be mentioned a process for introducing a vinyl group at the end utilizing frequent occurrence of the n-methyl group elimination reaction by polymerizing propylene under a high temperature using a stereorigid C2-symmetrical crosslinked metallocene catalyst (e.g., JP-T-2001-525461), a process for manufacture with maintaining high stereoregularity by increasing frequency of the β-methyl elimination reaction at relatively low temperature using a complex having a bulky substituent at a specific site or using a complex having a heterocyclic group at a specific site (e.g., JP-A-11-349634, JP-A-2009-299045), a process for manufacturing a macromonomer selectively having an end vinyl group wherein a vinyl comonomer having an easily eliminating functional group such as vinyl chloride is copolymerized in propylene by means of an isotactic structure-selective metallocene catalyst and the comonomer induces β-functional group elimination at the same time of insertion (Gaynor, S. G. Macromolecules 2003, 36, 4692-4698), a process for introducing an end vinyl group via β-hydrogen elimination without passing through a relatively difficult β-methyl group elimination process using a propylene polymerization catalyst (e.g., a post periodical transition metal complex represented by pyridyldiimine iron (II) complex) with which 2,1-insertion of propylene is predominant (Brookhart, M. et al. Macromolecules 1999, 32, 2120), and the like.

Of these, particularly preferred is a process for manufacture with maintaining high stereoregularity by increasing frequency of the 3-methyl elimination reaction at relatively low temperature using a complex having a heterocyclic group at a specific site (for example, JP-A-2009-299045), from the viewpoint of achieving both of high stereoregularity and high vinyl selectivity.

As a process for manufacturing the syndiotactic polypropylene macromonomer, there may be mentioned a process using a non-crosslinked metallocene catalyst having an extremely bulky substituent (Resconi, L. et al. J. Am. Chem. Soc. 1992, 114, 1025), a process for polymerizing propylene under a high temperature using a stereorigid Cs-symmetrical crosslinked metallocene catalyst (JP-T-2001-525461), a process for manufacturing a macromonomer selectively having an end vinyl group wherein a vinyl comonomer having an easily eliminating functional group such as vinyl chloride is copolymerized in propylene by means of a syndiotactic-selective metallocene catalyst and the vinyl comonomer induces β-functional group elimination at the same time of insertion (Kaminsky, W. et al. Macromol. Chem. Phys. 2010, ASAP), a process for introducing a vinyl group to an end of a syndiotactic polypropylene by β-hydrogen elimination from 2,1-insertion of propylene using a bis(phenoxyimine)titanium complex having a specific substituent (WO03/025025 or Cheman, A. E. et al. Macromolecules 2005, 38, 6268 etc.), and the like.

Of these, form the viewpoint of achieving both of high stereoregularity and high vinyl selectivity, preferred is a process for introducing a vinyl group to an end of a syndiotactic polypropylene by β-hydrogen elimination from 2,1-insertion of propylene using a bis(phenoxyimine)titanium complex having a specific substituent.

The crystalline polypropylene macromonomer usually has a vinyl group at one end but may contain a molecule having no vinyl group at the end and may contain a molecule having vinyl groups at both ends. Preferably, one end of the macromonomer molecule is a vinyl group and another end is an alkyl group. The process for manufacturing the crystalline polypropylene macromonomer to be used in the invention is not limited but it is preferred to manufacture it by coordination polymerization of propylene from the economical viewpoint, as mentioned above. This is because, with regard to the end of the crystalline polypropylene macromonomer molecule, the initiation end of the polymerization reaction becomes an alkyl group and the terminal end of the polymerization reaction becomes a vinyl group at high probability, in the case of manufacture by the process. In this case, the possibility that the both ends of the macromonomer molecule become vinyl groups is usually extremely low.

In the resulting crystalline polypropylene macromonomer, the ratio of molecules having a vinyl group at one end is usually 50% or more, preferably 80% or more, particularly preferably 90% or more. When the ratio is less than 50%, the ratio of the crystalline polypropylene macromonomer incorporated into the branched olefin copolymer as the side chain relative to the crystalline polypropylene macromonomer added is small, so that there is a concern that the performance of the copolymer as an elastomer becomes insufficient.

The ratio of the macromonomer molecule having a vinyl group (t-vinyl %) at one end represents a ratio of the number of molecules having a vinyl group at the end relative to all the macromonomer molecules and specifically the ratio is calculated as follows.

$$(t\text{-vinyl }\%)=[Mn\text{-}GPC]/[Mn\text{-}NMR]\times 100$$

Here, [Mn-GPC] is number-average molecular weight measured by GPC, [Mn-NMR] is number-average molecular weight calculated from the total number of protons on the alkyl carbons other than the vinyl group in the case where it is presumed that, in all the macromonomer molecules, one end of each molecule is necessarily a vinyl group and another end is necessarily an alkyl group.

In order to satisfy the above characteristic feature, the macromonomer is manufactured using an appropriate catalyst and polymerization conditions as in the above manufacturing process.

Moreover, the crystalline polypropylene macromonomer may be a branched crystalline polypropylene macromonomer having a crystalline polypropylene in the side chain unless it inhibits rigidity and heat resistance.

The structure of the crystalline polypropylene macromonomer is not particularly limited but specifically, the polypropylene in the macromonomer has a structure having high stereoregularity. As a factor representing degree of stereoregularity of polypropylene, "pentad (ratio)" is used. The pentad represents continuity of relative configuration of adjacent side-chain methyl groups in polypropylene and a higher value is interpreted as a higher stereoregularity. An isotactic pentad ratio (mmmm) is a ratio of the propylene unit at the center of a sequence in which five propylene monomer units are continuously meso-bonded relative to all the propylene units, the ratio being represented by percentage. A syndiotactic pentad ratio (rrrr) is a ratio of the propylene unit at the center of a sequence in which five propylene monomer units are continuously racemi-bonded relative to all the propylene units, the ratio being represented by percentage. The pentad is usually determined by $^{13}$C-NMR. Specifically, it is determined by the method described in JP-A-2003-292700. The structure of the polypropylene macromonomer to be used in the invention is preferably one having a high isotactic pentad ratio (mmmm) or one having a high syndiotactic pentad ratio (rrrr). This is because they form a stronger crystal having high crystallinity between the branched olefin copolymers as a "hard segment", the crystal acts as a stronger crosslinking point, and thereby it is considered that excellent elastomer performance is imparted.

As a crystalline polypropylene macromonomer having a high isotactic pentad ratio (hereinafter sometimes referred to as "isotactic polypropylene macromonomer"), the isotactic pentad ratio (mmmm) is usually 0.80 or more, preferably 0.90 or more. With an increase in the isotactic pentad ratio, the melting point is elevated, so that the case is preferred in view of further improvement in heat resistance. An upper limit thereof is not particularly limited unless the object of the invention is inhibited but 1.00 that is usually a numerical upper limit is the upper limit.

As a crystalline polypropylene macromonomer having a high syndiotactic pentad ratio (hereinafter sometimes referred to as "syndiotactic polypropylene macromonomer"), the syndiotactic pentad ratio (rrrr) is usually 0.60 or more, preferably 0.70 or more, more preferably 0.80 or more, further preferably 0.90 or more. With an increase in the syndiotactic pentad ratio, the melting point is improved and the heat resistance is further improved, so that the case is preferred. An upper limit thereof is not particularly limited unless the object of the invention is inhibited but 1.00 that is usually a numerical upper limit is the upper limit.

More preferred as the side chain of the branched olefin copolymer is a polypropylene macromonomer having a high syndiotactic pentad ratio in view of achieving the effects of the invention with a small amount of the side-chain component even when the regularity is relatively low.

As constituent components of the side chain, α-olefins other than ethylene and propylene may be contained. A slight amount of misinsertion(s) that may be introduced in the process of polymerization of propylene and a slight amount of comonomer(s) for compensating solubility at polymerization are allowed unless the rigidity and heat resistance of the side chain are remarkably inhibited. In view of maintaining the rigidity and heat resistance of the side chain, a homopolymer of propylene is preferred.

The crystalline polypropylene macromonomer has a melting point of usually 60° C. or higher, preferably 80° C. or higher, more preferably 100° C. or higher, further preferably 120° C. or higher. The melting point can be defined by differential thermal analysis (DSC) and can be used as an index of crystallinity of the crystalline polypropylene macromonomer. Amorphous or low crystalline polypropylene macromonomer cannot act as a hard segment capable of forming a physical crosslinking point and, even when it exists in the branched olefin copolymer as the side chain, the performance as an elastomer is not expectable.

The molecular weight of the crystalline polypropylene macromonomer to be used in the invention is not particularly limited but can be arbitrarily controlled for obtaining a composition having objective physical and mechanical properties.

The molecular weight of the crystalline polypropylene macromonomer can be determined from the total number of protons on the carbons ($sp^3$ carbons) other than the vinyl group in the case where it is presumed that one end of each molecule is necessarily a vinyl group and another end is necessarily an alkyl group in the crystalline polypropylene macromonomer, on the basis of the end vinyl group quantitatively determined on $^1$H-NMR spectrum. The number-average molecular weight (Mn) of the macromonomer is usually 50,000 or less, preferably 30,000 or less, more preferably 10,000 or less. Moreover, it is usually 1,000 or more, preferably 3,000 or more. When it exceeds the above upper limit, the number of molecules of the macromonomer relative to the weight of the macromonomer to be used in the polymerization reaction remarkably decreases and hence, as a result, the number of the side chains introduced into the branched olefin copolymer remarkably decreases. In order that the elastomer of the invention exhibits the function as an elastomer, at least two or more side chains per main chain of the copolymer molecule, namely two or more physical crosslinking points are necessary. However, when the number of the side chains decreases, the sufficient number of the physical crosslinking points in the branched olefin copolymer is sometimes not obtained, so that elastomer performance is sometimes impaired. Moreover, when the molecular weight is less than the lower limit, entanglement between the side chains becomes difficult and the growth of the physical crosslinking point between the polymer chains is not accelerated, so that the elastomer performance as a whole composition decreases similarly in some cases.

The molecular weight distribution of the side chain to be used in the invention is not particularly limited but, in order to enable precise physical property control by the side-chain molecular weight, the side-chain molecular weight distribution is preferably as narrow as possible. The distribution is usually 1 or more in terms of Mw/Mn, and is 6 or less, preferably 3 or less.

The amount of the propylene side chain derived from the crystalline polypropylene macromonomer contained in the branched olefin copolymer is not particularly limited but is usually 0.1% by weight or more, preferably 1% by weight or more, more preferably 5% by weight or more and is usually 50% by weight or less, preferably 40% by weight or less, more preferably 30% by weight or less based on all the monomers in terms of the raw material (macromer). When the amount is less than the above lower limit, there are a few copolymer chains substantially containing the side chain and there is a tendency that it is difficult to form the physical crosslinking between the polymer chains.

Moreover, when the amount exceeds the above upper limit, there is a tendency that flexibility of the whole composition becomes poor and there is a case where the composition is not suitable for the nature required as a thermoplastic elastomer.

The elastomer composition of the invention exhibits a function as an elastomer even when the content of the crystalline propylene polymer is relatively low. Therefore, it becomes possible to manufacture a composition which is extremely flexible and has low density but has high heat resistance and exhibits high elastomer performance, which is impossible for conventional polyolefin-based elastomers to achieve.

The number of the side chains contained one polymer chain of the branched olefin copolymer is not particularly limited but usually is preferably two or more. When two or more side chains are present, it is considered that the branched olefin copolymer acts as a crosslinking between polymer chains having elasticity and exhibits the function as an elastomer. However, since a distribution is usually present in the number of the side chains per main chain, it is virtually impossible to evaluate accurate number thereof per each polymer chain and the number is represented as an average value. With regard to the evaluation of the number, there exist a method of evaluating the number of the side chains actually bonded to the main chain by $^{13}$C-NMR, a method of calculating the number from the amount of the macromonomer incorporated into the copolymer by $^{1}$H-NMR, and further simply, a method of calculation from the amount of the macromonomer charged and the number-average molecular weight of the branched olefin copolymer, and the like. The present branched olefin copolymer can be characterized by any of the methods.

<Thermoplastic Elastomer Composition>

(1) Constituent Components

The thermoplastic elastomer composition of the invention contains the above branched olefin copolymer (hereinafter sometimes referred to as "component (E)"). The other constituent components are not particularly limited within the range where the objective physical properties of the invention are satisfied but usually, the composition contains the following components (F) and (G).

(E) A branched olefin copolymer having a main chain of an ethylene/α-olefin copolymer and a side chain derived from a crystalline propylene polymer containing a vinyl group at one end (F) An ethylene/α-olefin copolymer (G) A crystalline polypropylene macromonomer Of these, (E) corresponds to aforementioned one as <Branched Olefin Copolymer>.

(F) usually corresponds to a polymer chain in which the macromonomer is not incorporated into the ethylene/α-olefin copolymer formed in the synthetic reaction of the above copolymer (E) and the polymer chain is composed of the main chain component alone.

(G) usually corresponds to the unreacted macromonomer which is not incorporated in the synthetic reaction of the above copolymer (E). The macromonomer added to the reaction system of the synthetic reaction of (E) is usually incorporated as the side chain of (E) or is contained as (G) in the thermoplastic elastomer composition of the invention.

The weight ratio of the macromonomer incorporated into (E) to (G) is not particularly limited and is appropriately controlled so as to satisfy the objective physical properties.

The ratio of the above components (E), (F), and (G) contained in the composition is not particularly limited and is arbitrarily controlled so as to satisfy the objective physical properties. The composition preferably contains small amounts of (F) and (G) and is more preferably composed of (E) alone.

The composition containing the above components (E) to (G) may be obtained as a result of the copolymerization reaction at the manufacture of the component (E) as mentioned above or the components (E) to (G) may be each independently synthesized and mixed. However, in view of easiness of manufacture, preferred is one obtained as a result of the copolymerization reaction at the manufacture of the above component (E).

(2) Physical Properties

As physical properties, the composition of the invention has a glass transition point derived from the ethylene/α-olefin copolymer that is usually the main chain of the component (E) and is also the component (F) itself, and has a melting point derived from the crystalline polypropylene macromonomer that is the side chain of the component (E) and is also the component (G) itself, since the composition is evaluated as a mixture of the component (E), the component (F), and the component (G) of the above (1) Constituent Components.

The glass transition point of the composition of the invention is usually −30° C. or lower, preferably −50° C. or lower. Since the glass transition point of the composition of the invention is varied depending on the glass transition point of the above component (F), the composition usually has a glass transition point within the same range as that of the component (F) but there is a case where the glass transition point is not coincident depending on the compositional ratio or the like in the composition of the invention. Moreover, since the melting point of the composition of the invention is varied depending on the melting point of the above component (G), the composition usually has a melting point within the same range as values that are taken as preferable values for the melting point of the crystalline polypropylene macromonomer but there is a case where the melting point is not coincident depending on the compositional ratio or the like in the composition of the invention.

The molecular weight of the composition is not particularly limited but weight-average molecular weight (Mw) is measured by GPC and is preferably 200,000 or more, more preferably 300,000 or more.

Moreover, in the case where the branched olefin copolymer component and the ethylene/α-olefin copolymer component (component (E) and component (F)) have molecular weight sufficiently higher than the crystalline polypropylene macromonomer (component (G)) has, the two components can be separately evaluated in the molecular weight measurement by GPC. In that case, the number-average molecular weight (Mn) corresponding to the branched olefin copolymer component and the ethylene/α-olefin copolymer component (component (E) and component (F)) can be evaluated and are not particularly limited but is usually 100,000 or more, preferably 200,000 and is usually 1,000,000 or less, preferably 800,000 or less.

The physical properties of the composition of the invention as an elastomer can be judged, for example, by the methods described in Experimental Section of Proceedings of the National Academy of Sciences (2006) vol. 103 (42) pp. 15327 (aforementioned Non-Patent Document 1) or Macromolecules 2008, 41, 9548-9555.

The density of the composition of the invention is not particularly limited but is usually 0.880 g/ml or less, preferably 0.875 g/ml or less, more preferably 0.870 g/ml or less. When the density exceeds the above upper limit, flexibility tends to be poor and particularly, there is a case where the composition becomes a cause of defective physical properties such as a decrease in the impact resistance-improving effect and whitening associated with a decrease in miscibility in a compound with an isotactic polypropylene which is an important use application of a thermoplastic elastomer composition. Incidentally, the lower limit is not particularly limited as long as it falls within the range where the object of the invention is not inhibited.
(Process for Manufacturing Thermoplastic Elastomer Composition)
(1) Process for Manufacturing Thermoplastic Elastomer Composition The process for manufacturing the thermoplastic elastomer composition of the invention is not particularly limited within the range where an objective composition is obtained and it is sufficient to form a composition containing the branched olefin copolymer (E) having a main chain of an ethylene/α-olefin copolymer and a side chain derived from a crystalline propylene polymer containing a vinyl group at one end and usually containing the ethylene/α-olefin copolymer (F) and the crystalline polypropylene macromonomer (G). Specifically, there may be mentioned a process of synthesizing respective components (E) to (G) and mixing them to form a composition, a process for manufacturing the component (E) to thereby forming a composition with the components (F) and (G) that are reaction raw materials of the component (E), and the other processes.

In the manufacture of the composition of the invention, in view of advantageousness in production efficiency, there is usually used a process comprising: mixing components (a) to (c) below; and coordination polymerizing the components (a) to (c) in the presence of a transition metal catalyst so that the main chain may have the α-olefin (c) content of 5 to 70 mol %, (a) a crystalline propylene polymer containing a vinyl group at one end, and having an isotactic pentad ratio of 0.80 or higher and a number-average molecular weight of 50,000 or less, b) ethylene, and c) at least one kind of α-olefin having 3 to 20 carbon atoms.

Alternatively, the process comprises: mixing component (a') below and above (b) and (c); and coordination polymerizing the (a') below and above (b) and (c) in the presence of a transition metal catalyst so that the main chain may have the α-olefin (c) content of 5 to 70 mol %, a') a crystalline propylene polymer containing a vinyl group at one end, and having a syndiotactic pentad ratio of 0.60 or higher and a number-average molecular weight of 50,000 or less.

The above component (b) and component (c) correspond to raw materials forming the main chain part of the above branched olefin copolymer.

The ethylene (b) is not particularly limited and purified one, one obtained from various petroleum chemical plants, and the like may be used but, in view of quality, purified ethylene is preferred.

As the component (c), from the viewpoints of process, economical efficiency, and physical properties, at lest one kind of α-olefin having 3 to 8 carbon atoms (c-1) is preferred.

The step of mixing the above (a) to (c) or (a') to (c) is not particularly limited and any mixing method can be selected unless it inhibits the step of coordination polymerization of the above components in the presence of a transition metal catalyst in the subsequent step.

Moreover, the order of the mixing is not particularly limited and the above components may be charged and mixed all at once or may be added additionally and mixed during the polymerization reaction but, with regard to the α-olefin of (c), the mixing amount is appropriately controlled depending on the nature of the used transition metal catalyst so that the main chain may have the α-olefin content of 5 to 70 mol %.

In the step of mixing the above (a) to (c) or (a') to (c), the content of the above component (a) in the total amount of the above (a) to (c) or the content of the component (a') in the total amount of the above (a') to (c) is not particularly limited but is usually 50% by weight or less, preferably 30% by weight or less, more preferably 20% by weight or less, still preferably 15% by weight or less, further preferably 10% by weight or less and usually 1% by weight or more, preferably 3% by weight or more, more preferably 5% by weight or more.

The ratio is not particularly limited but is a value equal to or less than the ratio of the total amount of the above branched olefin copolymer added in the elastomer composition of the invention to be mentioned later. Specifically, in the case where (b) ethylene and (c) is propylene or butene, the components (b) and (c) are usually added in amounts larger than that of (a) or (a'). In this case, the ratio becomes smaller than the ratio of the total amount of the above crystalline polypropylene macromonomer added in the elastomer composition of the invention and, in the case where all the amounts of the above components (b) and (c) mixed are completely incorporated into the main chain in just proportions, these values become equal.

(2) Polymerization Step
(Transition Metal Catalyst)

The transition metal catalyst to be used in the above polymerization step is not particularly limited but is a catalyst which can copolymerize ethylene and a desired α-olefin to form an ethylene/α-olefin copolymer having a molecular weight necessary for obtaining sufficient physical or mechanical performance as a main chain part of the branched olefin copolymer and is capable of incorporating a significant amount of the crystalline polypropylene macromonomer.

As a kind of the catalyst, either of a heterogeneous catalyst and a homogeneous catalyst can be used. Of these, in order that the manufactured thermoplastic elastomer exhibits excellent performance, it is preferred that the macromonomer that is a raw material of the side chain of the above branched olefin copolymer is homogeneously copolymerized into the main chain. For this purpose, in view of a possibility of manufacturing a homogeneous main chain copolymer having a narrow molecular weight distribution, a homogeneous catalyst is preferably used and more preferred is a homogeneous catalyst using a transition metal complex.

The above transition metal complex includes a complex of a transition metal selected from Groups 3 to 15 of the periodic table, which usually contains one or more delocalized π-bonding ligands or polyvalent Lewis base ligands. Examples thereof include metallocene complexes, half metallocene complexes, constrained geometry complexes, and polyvalent pyridylamine complexes or other polychelation base complexes, and preferred are metallocene complexes.

As structures of the catalysts using specific transition metal complexes, there may be, for example, mentioned compounds described in JP-A-9-87313, JP-A-11-166010, JP-A-2004-238387, JP-A-2006-63041, JP-A-2007-217284, JP-A-2007-238891, JP-A-2008-297287, WO08/112,133, WO04/024740, WO08/112,133, WO03/40195, WO03/78480, WO03/78483, WO03/40195, WO02/92610, WO02/38628, WO02/02577, U.S. Application Laid-Open No. 2003/0004286, U.S. Application Laid-Open No. 2004/220050, U.S. Application Laid-Open No. 2004/010103, U.S. Pat. Nos. 6,515,155, 6,555,634, 6,320,005, 6,150,297, 6,103,657, 6,034,022, 6,268,444, 6,103,657, 6,015,868, 5,866,704, 5,470,993, and so forth.

As transition metal complexes preferably used in the invention, there may be mentioned complexes of a Group 4 metal of the periodic table, further preferably a complex represented by the following formula (VIII).

[Chem 2]

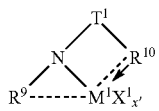

(VIII)

In the formula (VIII), $R^9$ is a hydrocarbon group having 1 to 30 carbon atoms, $T^1$ is a divalent crosslinking group having 1 to 30 atoms excluding a hydrogen atom, $R^{10}$ is a heteroaryl group having 5 to 20 carbon atoms and having a Lewis base functionality, which may have a substituent, $M^1$ is a metal of Group 4 in the periodic table, $X^1$ is an anionic, neutral or dianionic ligand group, x' is an integer of 0 to 5 denoting the number of $X^1$ groups, $R^{10}$ and $M^1$ may bind to each other to form a ring.

Further, in the structural formula, the solid lines, broken lines and arrow represent a bond, an arbitrary bond and a coordinate bond, respectively.

In the formula (VIII), $R^9$ is a hydrocarbon group having 1 to 30 carbon atoms and is preferably an alkyl group having 1 to 20 carbon atoms, a cycloalkyl group, or an aryl group.

$T^1$ is a divalent crosslinking group having 1 to 30 atoms excluding a hydrogen atom. As the atoms constituting $T^1$, at least one to 30 atoms excluding a hydrogen atom are contained and further a hydrogen atom may be contained. $T^1$ is preferably a substituted methylene group or substituted silylene group which has one or two substituents. As the substituent of the substituted methylene group or substituted silylene group, preferred is an alkyl group having 1 to 20 carbon atoms, a cycloalkyl group, or an aryl group.

$R^{10}$ is a heteroatom-containing aryl group having 5 to 20 carbon atoms and having a Lewis base functionality. Preferably, it is a pyridin-2-yl group and the pyridin-2-yl group may have a substituent. The substituent is an alkyl group having 1 to 30 carbon atoms, a cycloalkyl group, an aryl group, or a silyl group. These substituents may further have a substituent and the alkyl group and cycloalkyl group may contain an atom other than carbon and hydrogen (hereinafter referred to as heteroatom) in the structure. Moreover, $R^{10}$ and $M^1$ may together form a bond.

$M^1$ represents a Group 4 metal of the periodic table, and is preferably hafnium.

$X^1$ is a monoanionic, dianionic, or neutral ligand group, and is preferably a monoanionic ligand group.

x' represents the number of the $X^1$ groups and x' is an integer of 0 to 5, preferably an integer of 1 to 3.

In the structural formula, a solid line represents a bond, a broken line represents an arbitrary bond, and an arrow represents a coordinate bond.

As the complex represented by the formula (VIII), there may be mentioned compounds represented by the following formula (IX), formula (X), formula (XI), formula (XII), formula (XIII), and formula (XIV). Of these, the compound represented by the formula (IX) is preferred, the compound represented by the formula (X) is more preferred, and the compound represented by the formula (XI) or (XII) is most preferred.

[Chem 3]

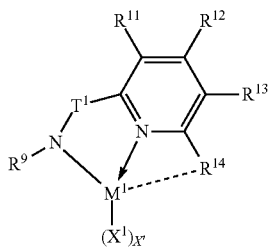

(IX)

In the formula (LX), $M^1$, $X^1$, x', $R^9$, and $T^1$ are the same as the definitions in the formula (VIII).

$R^{11}$, $R^{12}$, $R^{13}$, and $R^{14}$ are each a hydrogen atom, a halogen atom or an alkyl group having 1 to 20 carbon atoms, a cycloalkyl group, a heteroatom-containing alkyl group, a heteroatom-containing cycloalkyl group, an aryl group, or a silyl group. These groups may further have a substituent and it is preferably an alkyl group having 1 to 20 carbon atoms, a cycloalkyl group, or an aryl group. Of $R^{11}$, $R^{12}$, $R^{13}$, and $R^{14}$, two adjacent groups may bind to each other to thereby form a condensed ring.

[Chem 4]

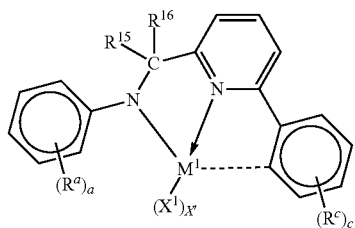

(X)

In the formula (X), $M^1$, $X^1$, and x' are the same as the definitions in the formula (VIII).

$R^a$ is independent in each presence and is an alkyl group having 1 to 20 carbon atoms, a cycloalkyl group, or an aryl group, preferably an alkyl group having 1 to 4 carbon atoms. These groups may further have a substituent.

a represents the number of the substituent $R^a$ and the value is from 1 to 5, preferably 1 or 2.

As $(R^a)_a$, preferred is one having two $R^a$ groups at two ortho positions to the nitrogen, and more preferably, $R^a$ is an isopropyl group or a t-butyl group.

$R^c$ is each independently a hydrogen atom, a halogen atom, an alkyl group having 1 to 20 carbon atoms, or an aryl group having 6 to 20 carbon atoms, and the above alkyl group and aryl group may further have a substituent.

Moreover, with regard to $R^c$, two adjacent R-$^c$ groups may bind to each other to form a condensed ring.

c represents the number of the substituent $R^c$ and the value is from 1 to 4.

$R^{15}$ and $R^{16}$ are each independently a hydrogen atom, a halogen atom, or an alkyl group having 1 to 20 carbon atoms or an aryl group, which may further have a substituent. Preferably, at least one of $R^{15}$ and $R^{16}$ is a group other than a hydrogen atom, and preferably, both of $R^{15}$ and $R^{16}$ are each an alkyl group or any one of $R^{15}$ and $R^{16}$ is an aryl group.

[Chem 5]

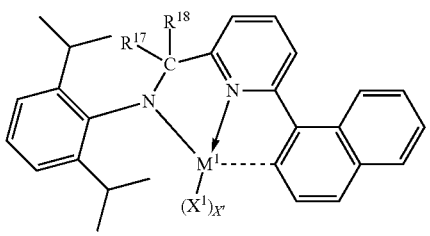

(XI)

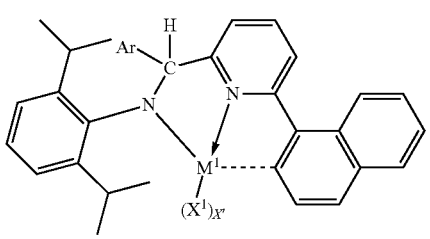

(XII)

In the formula (XI) and the formula (XII), $M^1$, $X^1$, and x' are the same as the definitions in the formula (VIII).

$R^{17}$ and $R^{18}$ are each independently an alkyl group having 1 to 4 carbon atoms, and each may further have a substituent. R-$^{17}$ group and R-$^{18}$ group may bind to each other to thereby form a ring.

Ar represents an aryl group having 6 to 20 carbon atoms, and is preferably a 2-isopropylphenyl group or a fused polycyclic aryl group, more preferably any of a 2-isopropylphenyl group, o-tolyl group, and a phenanthrene group, further preferably a 2-isopropylphenyl group.

As particularly preferred transition metal complexes included in the formula (XI), the following may be mentioned.

[N-(2,6-di(1-methylethyl)phenyl)amido]dimethyl(α-naphthalene-2-diyl(6-pyridine-2-diyl)methane)]hafnium dimethyl;

[N-(2,6-di(1-methylethyl)phenyl)amido]dimethyl(α-naphthalene-2-diyl(6-pyridine-2-diyl)methane)]hafnium di(N,N-dimethylamide);

[N-(2,6-di(1-methylethyl)phenyl)amido]dimethyl(α-naphthalene-2-diyl(6-pyridine-2-diyl)methane)]hafnium dichloride;

[N-(2,6-di(1-methylethyl)phenyl)amido]diethyl(α-naphthalene-2-diyl(6-pyridine-2-diyl)methane)]hafnium dimethyl;

[N-(2,6-di(1-methylethyl)phenyl)amido]diethyl(α-naphthalene-2-diyl(6-pyridine-2-diyl)methane)]hafnium di(N,N-dimethylamide);

[N-(2,6-di(1-methylethyl)phenyl)amido]diethyl(α-naphthalene-2-diyl(6-pyridine-2-diyl)methane)]hafnium dichloride.

Moreover, as particularly preferred transition metal complexes included in the formula (XII), the following may be mentioned.

[N-(2,6-di(1-methylethyl)phenyl)amido](o-tolyl)(α-naphthalene-2-diyl(6-pyridine-2-diyl)methane)]hafnium dimethyl;

[N-(2,6-di(1-methylethyl)phenyl)amido](o-tolyl)(α-naphthalene-2-diyl(6-pyridine-2-diyl)methane)]hafnium di(N,N-dimethylamide);

[N-(2,6-di(1-methylethyl)phenyl)amido](o-tolyl)(α-naphthalene-2-diyl(6-pyridine-2-diyl)methane)]hafnium dichloride;

[N-(2,6-di(1-methylethyl)phenyl)amido](2-isopropylphenyl)(α-naphthalene-2-diyl(6-pyridine-2-diyl)methane)] hafnium dimethyl;

[N-(2,6-di(1-methylethyl)phenyl)amido](2-isopropylphenyl)(α-naphthalene-2-diyl(6-pyridine-2-diyl)methane)] hafnium di(N,N-dimethylamide);

[N-(2,6-di(1-methylethyl)phenyl)amido] (2-isopropylphenyl)(α-naphthalene-2-diyl(6-pyridine-2-diyl)methane)] hafnium dichloride;

[N-(2,6-di(1-methylethyl)phenyl)amido] (phenanthren-5-yl) (α-naphthalene-2-di yl(6-pyridine-2-diyl)methane)] hafnium dimethyl;

[N-(2,6-di(1-methylethyl)phenyl)amido](phenanthren-5-yl) (α-naphthalene-2-diyl(6-pyridine-2-diyl)methane)] hafnium di(N,N-dimethylamide); and

[N-(2,6-di(1-methylethyl)phenyl)amido](phenanthren-5-yl) (α-naphthalene-2-diyl(6-pyridine-2-diyl)methane)] hafnium dichloride.

[Chem 6]

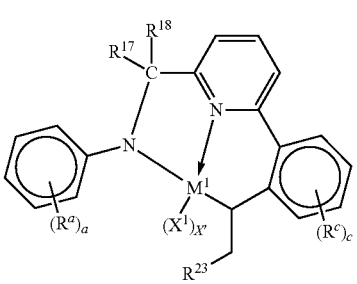

(XIII)

In the formula (XIII), $M^1$, $X^1$, and x' are the same as the definitions in the formula (VIII).

$R^a$ is each independently an alkyl group having 1 to 4 carbon atoms, which may further have a substituent.

a represents the number of the substituent $R^a$ and the value is from 1 to 5, preferably 1 or 2.

As $(R^a)_a$, preferred is one having two $R^a$ groups at two ortho positions to the nitrogen, and more preferably, $R^a$ is an isopropyl group or a t-butyl group.

$R^c$ is each independently a hydrogen atom, a halogen atom, an alkyl group having 1 to 20 carbon atoms, or an aryl group having 6 to 20 carbon atoms, which may further have a substituent. Two adjacent R-$^c$ groups may bind to each other to form a ring.

c represents the number of groups and the value is from 1 to 4, preferably 1 or 2.

$R^{17}$ and $R^{18}$ are as defined previously.

Moreover, the most preferred transition metal complex of the above formula is one represented by the following formula (XIV).

[Chem 7]

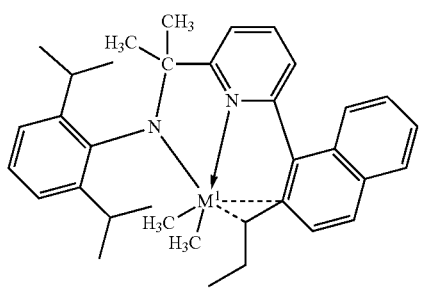
(XIV)

In the formula (XIV), $M^1$ is as defined above and a bond, an arbitrary bond, and electron pair-donating interaction are represented by a solid line, a broken line, and an arrow, respectively.

(Cocatalyst)

Each of the above transition metal catalysts (hereinafter represented as component [A] or reworded as "catalyst precursor") can be activated by combining it with various known cocatalysts, preferably a cation-forming cocatalyst, a strong Lewis acid, or both of them to form an active catalyst composition.

In the invention, it is usually preferred to use at least one component selected from the following components [B-1] to [B-4] as a cocatalyst (hereinafter also referred to as component [B]):

Component [B-1]: an organoaluminum oxy compound,
Component [B-2]: an ionic compound capable of reacting with the catalyst precursor to replace it with a cation,
Component [B-3]: a Lewis acid,
Component [B-4]: a layered compound Moreover, as the organoaluminum oxy compound of the component [B-1], specifically, there may be mentioned compounds represented by the following general formulae (XIX), (XX), and (XXI).

[Chem 8]

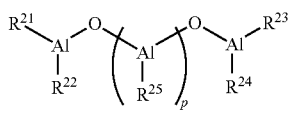
(XIX)

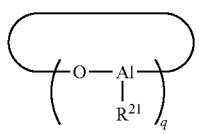
(XX)

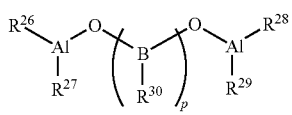
(XXI)

[wherein, $R^{21}$, $R^{22}$, $R^{23}$, $R^{24}$, $R^{25}$, $R^{26}$, $R^{27}$, $R^{28}$, $R^{29}$, and $R^{30}$ are each independently a hydrogen atom or a hydrocarbon atom, and represents an alkyl group having preferably 1 to 10 carbon atoms, particularly preferably 1 to 8 carbon atoms; and p and q are each represents an integer of 1 to 40, preferably 2 to 30.]

The compounds represented by the general formulae (XIX) and (XX) are each an organoaluminum oxy compound (hereinafter sometimes referred to as "aluminoxane") and is obtained by the reaction of at least one kind of trialkylaluminum with water. Specifically, there may be mentioned aluminoxanes obtained from one kind of trialkylaluminum and water, such as methylaluminoxane, aluminoxanes having two or more kinds of alkyl groups, obtained from two or more kinds of trialkylaluminums and water and the like, such as methylethylaluminoxane. More preferred are methylaluminoxane, methylisobutylaluminoxane, and methyl-n-octylaluminoxane.

It is also possible to use a plurality of the above organoaluminum oxy compounds in combination. The above aluminoxane can be prepared under known various conditions. The compound represented by the general formula (XXI) can be obtained by the reaction of one kind of trialkylaluminum or two or more kinds of trialkylalminums with an alkylboronic acid represented by the following general formula (XXII) in a ratio of 10:1 to 1:1 (molar ratio). In the general formula (XXII), $R^{30}$ represents a hydrocarbon residue having 1 to 10 carbon atoms, preferably 1 to 8 carbon atoms or a halogenated hydrocarbon group.

$$R^{30}\text{—B—}(OH)_2 \quad (XXII)$$

As the ionic compound of the component [B-2] capable of reacting with the component [A] to replace the component [A] with a cation, a compound represented by the following general formula (XXIII) may be mentioned.

$$[K]^{e+}[Z]^{e-} \quad (XXIII)$$

In the general formula (XXIII), K is a cation component and there may be mentioned a carbenium cation, a tropylium cation, an ammonium cation, an oxonium cation, a sulfonium cation, a phosphonium cation, and the like. Moreover, there may be also mentioned cations of metals which tend to be reduced per se, cations of organometals, and the like. Specific examples of the above cations include triphenylcarbonium, diphenylcarbonium, cycloheptatrienium, indenium, triethylammonium, tripropylammonium, tributylammonium, tricyclohexylammonium, dimethyloctadecylammonium, methyldioctadecylammonium, N,N-dimethylanilinium, triphenylphosphonium, trimethylphosphonium, tris(dimethylphenyl)phosphonium, tris(dimethylphenyl)phosphonium, tris(methylphenyl)phosphonium, triphenylsulfonium, triphenylsulfonium, triphenyloxonium, triethyloxonium, pyrylium, silver ion, gold ion, platinum ion, copper ion, palladium ion, mercury ion, ferrocenium ion, and the like. Preferably used are triphenylcarbonium, dimethyloctadecylammonium, methyldioctadecylammonium, and N,N-dimethylanilinium.

In the above general formula (XXIII), Z is an anion component and is a component (generally a non-coordinated component) which constitutes a counter anion against the cation species formed by the conversion of the component [A]. As Z, there may be mentioned anions of organoboron compounds such as tetraphenylborate, tetrakis(pentafluorophenyl)borate, and tetrakis(nonafluorobiphenyl)borate; anions of organoaluminum compounds such as tetraphenylaluminum and tetrakis(3,4,5-trifluorophenyl)aluminum; anions of organogallium compounds such as tetraphenylgallium and tetrakis(3,4,5-trifluorophenyl)gallium; anions of organophosphorus compounds such as tetraphenylphosphorus and tetrakis(pentafluorophenyl)phosphorus; anions of organoarsenic compounds such as tetraphenylarsenic and tetrakis(pentafluorophenyl)arsenic; anions of organoantimony compounds such as tetraphenylantimony and tetrakis(pentafluorophenyl)antimony; and the like. Of these, preferably used are anions of organoboron compounds and specifically tetrakis(perfluoroaryl)boron compounds such as tetrakis (pentafluorophenyl)boron and tetrakis(nonafluorobiphenyl) boron.

As the Lewis acid of the component [B-3], especially the Lewis acid capable of converting the component [A] into a cation, there may be exemplified various organoboron compounds such as triphenylboran, tris(pentafluorophenyl)boran, and tris(nonafluorobiphenyl)boran; halogenated metal compounds such as aluminum chloride, magnesium chloride hydrides, magnesium bromide hydroxide, and magnesium chloride alkoxides; solid acids such as alumina and silica-alumina; and the like. There may be mentioned preferably organoboron compounds, more preferably tris(perfluoroaryl) borons such as tris(pentafluorophenyl)boron and tris(nonafluorobiphenyl)boron.

The layered compound of the component [B-4] is a compound having such a crystal structure that faces composed by ionic bond or the like are stacked one another in parallel with a weak bonding force therebetween, in which ions contained therein are exchangeable.

As the layered compound, there may be specifically mentioned the inorganic silicate or the ion exchangeable layered compound to be mentioned below.

As the inorganic silicates, there may be mentioned clays, clay minerals, zeolite, diatomaceous earth, and the like. As these, synthesized products may be used or naturally yielding minerals may be used.

Specific examples of clays and clay minerals may include allophane group ones such as allophane; kaolin group ones such as dickite, nacrite, kaolinite and anauxite, halloysite group ones such as meta-halloysite and halloysite; serpentine group ones such as chrysotile, lizardite and antigorite; smectite group ones such as montmorillonite, sauconite, beidellite, nontronite, saponite and hectorite; vermiculite minerals such as vermiculite; mica minerals such as illite, sericite and glauconite; attapulgite; sepiolite; palygorskite; bentonite; gnarl clay; gairome clay; hisingerite; pyrophyllite; chlorite groups; and the like. These inorganic silicates may form mixed layers thereof.

As the artificially synthesized products, there may be mentioned synthetic mica, synthetic hectorite, synthetic saponite, synthetic taeniolite and the like.

Among these specific examples, kaolin group ones, halloysite group ones, serpentine group ones, smectite, vermiculite minerals, mica minerals, synthetic mica, synthetic hectorite, synthetic saponite and synthetic taeniolite are preferably mentioned, and more preferred are smectite, vermiculite minerals, synthetic mica, synthetic hectorite, synthetic saponite and synthetic taeniolite, and further preferred is montmorillonite.

As the layered compound in the component [B-4], there can be exemplified ionic crystalline compounds having a layered crystal structure such as a hexagonal closest packing type, an antimony type, a $CdCl_2$ type and a $CdI_2$ type. Specific examples of the ion exchangeable layered compounds having such a crystal structure include crystalline acid salts of polyvalent metals such as $\alpha$-$Zr(HAsO_4)_2 \cdot H_2O$, $\alpha$-$Zr(HPO_4)_2$, $\alpha$-$Zr(KPO_4)_2 \cdot 3H_2O$, $\alpha$-$Ti(HPO_4)_2$, $\alpha$-$Ti(HAsO_4)_2 \cdot 2O$, $\alpha$-$Sn(HPO_4)_2 \cdot H_2O$, $\gamma$-$Zr(HPO_4)_2$, $\gamma$-$Ti(HPO_4)_2$ and $\gamma$-$Ti(NH_4PO_4)_2 \cdot H_2O$.

These [B-4] layered compounds may be used directly as they are, but are preferably processed with acids such as hydrochloric acid, nitric acid or sulfuric acid, and/or with salts such as LiCl, NaCl, KCl, $CaCl_2$, $MgCl_2$, $MgSO_4$, $ZnSO_4$, $Ti(SO_4)_2$, $Zr(SO_4)_2$, or $Al_2(SO_4)_3$. Moreover, they may be ground or granulated for morphology control and, for obtaining polymers having good particle properties, it is preferred to granulate the compounds. In addition, the above component is generally dehydrated and dried before it are used.

Among the components [B-1] to [B-4], the [B-4] layered compound is preferably used, and particularly preferably, an inorganic silicate salt is used.

(Fine Particle Carrier)

In the polymerization step of the invention, in addition to the aforementioned catalyst precursor component [A] and the cocatalyst component [B], a fine particle carrier (hereinafter also referred to as component [C]) may be co-present as an optional component. The component [C] is composed of an inorganic or organic compound, and is a fine particle carrier having a particle diameter of usually 5 μm or more, preferably 10 μm or more and usually 5 mm or less, preferably 2 mm or less.

As the inorganic carrier, for example, there may be mentioned oxides such as $SiO_2$, $Al_2O_3$, MgO, ZrO, $TiO_2$, $B_2O_3$ and ZnO; composite metal oxides such as $SiO_2$—MgO, $SiO_2$-$Al_2O_3$, $SiO_2$—$TiO_2$, $SiO_2$—$Cr_2O_3$ and $SiO_2$-$Al_2O_3$—MgO; and the like.

As the organic carrier, for example, there may be mentioned fine particle carriers of porous polymers composed of (co)polymers of α-olefins having 2 to 14 carbon atoms such as ethylene, propylene, 1-butene and 4-methyl-1-pentene; (co)polymers of aromatic unsaturated hydrocarbons such as styrene and divinylbenzene; and the like. The specific surface area of them falls within the range of usually 20 $m^2/g$ or more, preferably 50 $m^2/g$ or more and usually 1,000 $m^2/g$ or less, preferably 700 $m^2/g$ or less.

The pore volume falls within the range of usually 0.1 $cm^3/g$ or more, preferably 0.3 $cm^3/g$ or more, more preferably 0.8 $cm^3/g$ or more.

As the fine particle carrier, any one kind of the above exemplified various inorganic carriers and/or organic carriers may be used solely or two or more kinds thereof may be used together in any combination and in any ratio. Incidentally, the catalyst for α-olefin polymerization of the invention may contain other components in addition to the above components [A] and [B] and the above component [C] that is an optional component unless the gist of the invention is impaired.

(Organoaluminum)

In the above polymerization step, there may be further used an organoaluminum compound represented by the following general formula (XXIV) (hereinafter also referred to as component [E]) as a catalyst.

$$AlR^{31}{}_m X_{3-m} \qquad \text{(XXIV)}$$

[wherein $R^{31}$ represents a hydrocarbon group having 1 to 20 carbon atoms; X represents a hydrogen atom, a halogen atom, an alkoxy group, or an aryloxy group; and m is an integer of $0 < m \leq 3$]

Specifically, preferred as the organoaluminum compound are trialkylaluminums such as trimethylaluminum, triethylaluminum, tripropylaluminum and triisobutylaluminum; halogen or alkoxy-containing alkylaluminums such as diethylaluminum monochloride and diethylaluminum ethoxide. Besides them, there can also be used aluminoxanes such as methylaluminoxane. They may be used as a mixture thereof. Of these, particularly preferred are trialkylaluminums, dialkylaluminum alkoxides, or alkylaluminum dialkoxides. These optional components may be used in combination of two or more thereof.

An active catalyst composition is formed by bringing the catalyst precursor [A] component, the cocatalyst [B] component, and optionally the organoaluminum [E] component into contact but the method for the contact is not particularly limited. The contact may be conducted not only at the catalyst preparation but also at the manufacture of the composition of the invention, preferably at a step of mixing and coordination polymerization of the above (a) to (c) or (a') to (c). The contact may be conducted in an inert gas such as nitrogen or at the polymerization reaction to be mentioned later or may be conducted in a solvent. When a solvent is used, it is preferred to conduct the contact in an inert hydrocarbon solvent such as pentane, hexane, heptane, toluene or xylene.

With regard to the contact temperature, the contact is conducted between −20° C. and a boiling point of the solvent and particularly is preferably conducted between room temperature and the boiling point of the solvent. The molar ratio of the catalyst/cocatalyst to be used is preferably from 1:10,000 to 100:1, more preferably from 1:5,000 to 10:1, most preferably 1:1,000 to 1:1.

In the case where the organoaluminum oxy compound [B-1] as the component [B] is used, it is used in an amount at least 50 times the amount of the transition metal catalyst on a molar basis. In the case where the component [B-2] or the component [B-3] other than Lewis acids is used as the component [B], the molar ratio thereof to the component [A] is usually from 0.5:1 to 10:1, more preferably from 1:1 to 6:1, most preferably from 1:1 to 5:1.

As the component [B], in the case where the solid Lewis acid in [B-3] or the component [B-4] is used, the component [A] is used in the range of usually 0.0001 to 10 mmol, preferably 0.001 to 5 mmol per 1 g of the component [B]. Optionally, the component [E] is used in the range of 0 to 10.000 mmol, preferably 0.01 to 100 mmol.

(Polymerization Step)

In the polymerization step in the manufacturing process of the invention, the conditions are not particularly limited as long as the objective compounds are obtained. Preferably, the crystalline polypropylene macromonomer, ethylene and α-olefin are simultaneously come into contact with the above catalyst (in the case where the active catalyst composition is used, the composition, the same shall apply hereinafter). More preferred is a process wherein ethylene and α-olefin and the crystalline polypropylene macromonomer are previously mixed and the above catalyst is brought into contact therewith. The crystalline polypropylene macromonomer may be collectively charged prior to polymerization, or may be charged sequentially or continuously during polymerization. Moreover, it is also possible to perform continuously the step of manufacturing the crystalline polypropylene macromonomer and the step of copolymerizing the crystalline polypropylene macromonomer with the other olefin monomer to manufacture the elastomer composition of the invention. At this time, the total amount of the crystalline polypropylene macromonomer to be added is not particularly limited, but is controlled so that, as a result of the polymerization step, sum of the crystalline polypropylene macromonomer and component(s) derived from the monomer in the resulting elastomer composition of the invention becomes 50% by weight or less, preferably 40% by weight or less, more preferably 30% by weight or less. Incidentally, the component(s) derived from the macromonomer means partial structure(s) derived from the macromonomer, which constitutes the side chain of the branched olefin copolymer as mentioned above as (E).

When the sum exceeds the upper limit, there is a tendency that the flexibility of the entire composition becomes poor and may not be suitable as the nature required as a thermoplastic elastomer. The lower limit is not limited as long as it does not impair the performance of the composition of the invention but is usually 1% by weight or more, preferably 5% by weight or more. A smaller amount is preferable since an elastomer having high flexibility is obtained and also the case is advantageous in view of economical efficiency.

After the polymerization step, the crystalline polypropylene macromonomer is present in the composition of the invention in the form of either one incorporated as the side chain component of the branched olefin copolymer mentioned above as (E) or the unreacted macromonomer mentioned above as (G). That is, in the composition of the invention, the weight ratio of the sum of the crystalline polypropylene macromonomer and the component(s) derived from the macromonomer is the same as the total amount of the crystalline polypropylene macromonomer added in the manufacturing step, specifically the weight ratio of the weight of the charged crystalline polypropylene macromonomer represented as the above (a) or (a') to the amount of the obtained elastomer composition.

In the reaction of manufacturing the elastomer composition of the invention, a solvent may be used or may not be used. When a solvent is used, examples thereof include hydrocarbons such as n-pentane, n-hexane, n-heptane, n-octane, n-decane, benzene, toluene, xylene, cyclohexane, methylcyclohexane and dimethylcyclohexane; halogenated hydrocarbons such as chloroform, methylene chloride, carbon tetrachloride, tetrachloroethane, chlorobenzene and o-dichlorobenzene; polar solvents such as n-butyl acetate, methyl isobutyl ketone, tetrahydrofuran, cyclohexanone and dimethyl sulfoxide; and the like. Of these, hydrocarbons are preferable. Any one of these solvents may be used alone or two or more thereof may be used together in any combination and in any ratio. In the case where these solvents are used, since the solvents are usually removed using a known method after the completion of the reaction, the solvent is not contained usually in the composition of the invention but in the composition of the invention, an extremely small amount of the solvent may remain in the range where the physical properties of the invention are not impaired.

The thermoplastic elastomer composition of the invention can be manufactured by solvent polymerization using the above-described solvent and it is also possible to use liquid-phase solvent-free polymerization, vapor phase polymerization, and melt polymerization where substantially no solvents are employed. In addition, a polymerization mode may be either of continuous polymerization and batch polymerization. It is also possible to employ a so-called multi-stage polymerization where conditions are changed in multiple stages.

Catalyst concentration is not particularly limited but, for example, in the case where the reaction mode is solution polymerization, the concentration is in the range of usually 0.01 mg or more, preferably 0.05 mg or more, further preferably 0.1 mg or more and usually 100 g or less, preferably 50 g or less, more preferably 25 g or less relative to 1 of the reaction solution.

There is no particular limitation on the polymerization temperature, polymerization pressure, and polymerization time, but usually, it is possible to achieve an optimum setting from the following ranges, taking productivity and the ability of the process into account. That is, the polymerization temperature is in the range of usually −70° C. or higher, preferably −50° C. or higher, further preferably −30° C. or higher, particularly preferably −20° C. or higher and usually 150° C. or lower, preferably 100° C. or lower. Furthermore, the polymerization pressure is in the range of usually 0.01 MPa or more, preferably 0.05 MPa or more, further preferably 0.1

MPa or more and usually 100 MPa or less, preferably 20 MPa or less, further preferably 5 MPa or less.

The polymerization time is in the range of usually 0.1 hours or more, preferably 0.2 hours or more, further preferably 0.3 hours or more and usually 30 hours or less, preferably 25 hours or less, more preferably 20 hours or less, further preferably 15 hours or less.

It is possible to use a molecular weight (MFR) modifier so that flowability of the polymer becomes appropriate. Hydrogen is preferred as the modifier.

(Applications of Thermoplastic Elastomer Composition)

The thermoplastic elastomer composition of the invention has excellent flexibility, transparency and heat resistance, and therefore is preferably used in various fields where conventional ethylene-based materials, propylene-based materials as well as flexible PVC and thermoplastic elastomers are used, either as it is alone, as a main ingredient, or as an additive. Molding methods are not specifically limited. For films and sheets, they may be formed by inflation, T-die method, or calendering which is applied to polyolefins. They may be single-layered one or various layers of two or more layers can be appropriately provided as required. For lamination, extrusion lamination, thermal lamination, dry lamination or the like may be employed. Moreover, the films can be monoaxially or biaxially oriented. As orientation methods, rolling, tentering, tubular formation and the like may be mentioned. In addition, the films may be surface-processed through corona discharging treatment, flame treatment, plasma treatment, ozone treatment or the like.

In the case where laminates are consititued utilizing the excellent flexibility, transparency and heat resistance of the thermoplastic elastomer composition of the invention, the material to form the other layers may be any of various propylene-based polymers such as propylene homopolymer, propylene/α-olefin copolymer and propylene/α-olefin block copolymer; ethylene-based polymers such as high-pressure-process polyethylene, ethylene/α-olefin copolymer, ethylene/vinyl acetate copolymer, EVOH and ethylene/norbornene copolymer; other various olefin copolymers such as polybutene-1 and poly-4-methylpentene-1 (TPX resin); adhesive polyolefins modified with maleic anhydride or the like; polyamides; polyesters; polyester-based elastomers; and the like.

(Applications in the Field of Films and Sheets)

The applications of the thermoplastic elastomer composition of the invention or its modified derivatives in the field of films and sheets are not particularly limited. The following applications may be mentioned as some examples. That is, there may be mentioned field of wrapping or packaging foods or sundries, such as stretch films for wrapping, wrapping films for industrial or household use, pallet stretch films, stretch labels, shrink films, shrink labels, films for sealants, films for retorts, sealant films for retorts, hot-melt films, hot-adhesive films, hot-seal films, bag-in-box sealant films, retort pouches, standing pouches, spout pouches, laminate tubes, laminate bags, and fiber-wrapping films; field of agricultural films such as films for houses and multi-films; field of films and sheets for medical use, such as infusion bags, multi-room containers for high-calorie infusion or peritoneal dialysis (CAPD), discharge bags for peritoneal dialysis, blood bags, urine bags, operation bags, ice pillows, ampoule cases, and PTP wrapping bags; field of building materials, such as civil engineering impermeable sheets, cut-off materials, caulking materials, floor materials, roofing materials, plate decorative films, plate skin films and wallpapers; field of automobile parts, such as leathers, ceiling materials, trunk room liners, interior skin materials, shock-absorbent sheets and sound-absorbent sheets; field of light electrical appliances, such as display covers, battery cases, mouse pads, mobile phone cases, IC card cases and CD-ROM cases; field of toiletry and sanitary goods, such as toothbrush cases, puff cases, cosmetic cases, eye drop and other medicine cases, tissue cases and face packs; field of office supplies, such as films and sheets for stationery, clear files, pen cases, pocketbook covers, desk mats, key board covers, book covers and binders; field of appliances and sundries for household use, such as leathers for furniture, toys such as beach balls, rain goods such as umbrellas and raincoats, table cloths, blister packages, bathtub covers, towel cases, fancy cases, tag cases, pouches, charm bags, insurance certificate covers, passbook covers, passport cases and cutlery cases; retroreflector sheets, synthetic paper, and the like. In addition, adhesive tapes, marking films, semiconductor or glass dicing films, surface-protective films, steel plate and plywood plate-protective films, car-protective films, wrapping and binding adhesive tapes, adhesive tapes for office use or household use, bonding adhesive tapes, paint-masking adhesive tapes, surface-protective adhesive tapes, sealing adhesive tapes, anticorrosive and waterproof adhesive tapes, electric insulating adhesive tapes, adhesive tapes for electronic appliances, adhesive tapes for medical and sanitary use such as plaster films and substrate films for adhesive plasters, adhesive tapes for discrimination and decoration, tapes for display, wrapping tapes, surgical tapes and adhesive tapes for labels as the field of films and sheets in which adhesiveness is imparted by applying an adhesive to a substrate.

(Applications in the Field of Injection Molding and Extrusion Molding)

The applications of the thermoplastic elastomer compositions of the invention or its modified derivative in the field of injection molding and extrusion molding are not particularly limited. The following applications may be mentioned as some examples. That is, there may be mentioned coating materials for electric cables, codes and wire harnesses in the field of electric and electronic appliances; control cable coating materials, air bags and covers, mud guards, bumpers, boots, air hoses, lamp packing, gaskets, various braids such as window braids, site shields, weather strips, glass run channels, grommets and shock-absorbent and sound-absorbent parts in the field of automobile parts; various gaskets, grips, belts, foot rubbers, rollers, protectors, suckers, gaskets for refrigerators, various rolls for OA (Office Automation) appliances, tubular shaped articles such as hoses and tubes, profile-shaped articles, leather-like articles and engage tools in the field of electric and electronic appliances for household use and light electric appliances; toys such as soft-touch dolls and figures; daily sundries such as pen grips and toothbrush grips; containers such as housewares and tableware, binding bandages, blow-molded infusion bottles, food bottles, and other various bottles such as those for cosmetics or personal care; catheters, syringes, syringe gaskets, infusion cylinders, tubes, ports, caps, rubber stoppers, disposable containers in parts for medical use; and the like. In addition, the composition of the invention is also usable in applicaions by foam-molding.

(Applications in the Field of Fibers and Nonwoven Fabrics)

The applications of the thermoplastic elastomer composition of the invention or its modified derivatives in the field of fibers and nonwoven fabrics are not particularly limited. The following applications may be mentioned as some examples. That is, they may be used to fibers and flat yarns such as continuously spun fibers, continuously crimped yarns, short fibers, monofilaments, or may be formed into nonwoven fabrics by means of melt-blowing or spun-bonding. Thereby, there may be mentioned applications, for example, sanitary goods such as disposable diapers; medical goods such as surgical gowns and gloves; carpets, their linings, ropes, and the like. In addition, there may be mentioned canvas cloths, tent cloths, hoods, flexible containers, leisure sheets and tarpaulins resulting from lamination of these nonwoven fabrics or monofilaments, or knitted fabrics such as flat yarns or slit tapes with films or sheets.

(Applications in Modifiers)

The thermoplastic elastomer composition of the invention or its modified derivatives have an excellent affinity with polypropylene, and are therefore preferably used for modifying polypropylene. By the modification, polypropylene may have improved flexibility, transparency and stiffness, and in addition, may have improved hot-sealability, impact resistance, and affinity with additives. Accordingly, the composition of the invention can also be used for improving the surface of molded articles. Further, utilizing good thermal fusibility, it may also be used in other applications of hot-melt adhesives, tackifiers, asphalt modifiers, bitumen modifiers, waterproofed paper, and the like utilizing the thermal fusibility may be also mentioned as examples of applications.

EXAMPLES

The following will describe the invention more specifically based on Examples, but the invention should not be construed as being limited to the following Examples unless it exceeds the gist thereof.

Measurement of physical properties, analyses, and the like in the following Examples are performed according to the following methods.

(1) GPC Measurement

The number-average molecular weight (Mn) of a polymer was determined by GPC measurement. The GPC measurement was performed using Alliance GPCV2000 manufactured by Waters Corporation and using a viscometer and a differential refractometer as the detector. As columns, 4 columns of HT6E and one column of HT2 both manufactured by Waters Corporation were used in combination.

Using 1,2,4-trichlorobenzene containing 0.01% by weight of di-t-butyl-hydroxytoluene (BHT) as a mobile phase solvent, elution was made at 140° C. at 1.0 ml/min. The data obtained were calibrated using a monodisperse standard polyethylene manufactured by Polymer Standards Service Corporation. A sample was charged into an oven at 140° C. before 24 hours from the measurement and dissolved.

Unless otherwise stated, after a crystalline polypropylene macromonomer (component (G)) was discriminated from a branched olefin copolymer component (component (E)) and an ethylene/α-olefin copolymer component (component (F)), the molecular weight of the composition in Examples was evaluated as number-average molecular weight of a mixture of the component (E) and the component (F).

(2) DSC Measurement

The measurement of the melting point ($T_m$) and the glass transition point ($T_g$) of a polymer was carried out by DSC measurement. The DSC measurement was carried out using a Q1000 differential scanning calorimeter manufactured by TA Instruments Co., which was fitted with an auto sampler. A sample sealed in an aluminum pan was measured under nitrogen, the temperature being elevated from room temperature to 200° C. at a rate of 10° C./min, then being lowered to −100° C. at 10° C./min, and further being elevated to 200° C. at a rate of 10° C./min. As values of $T_g$ and $T_m$, those at the second temperature elevation were recorded.

(3) NMR Measurement

The number-average molecular weight (Mn) of the crystalline propylene macromonomer containing a vinyl group at one end which was obtained according to the invention was determined from the total number of protons of the alkyl group in the case where it is presumed that one end of all the macromonomer molecules was the vinyl group, by measuring the $^1$H-NMR spectrum. The stereoregularity (isotactic pentad ratio, syndiotactic pentad ratio) of the macromonomer obtained according to the invention is determined by the measurement of $^{13}$C-NMR spectrum of the polymer.

For the $^1$H-NMR measurement of the polymer, there was used Inova 500 ($^1$H observation frequency: 500 MHz) manufactured by Varian Co. fitted with a $^1$H/BB variable Z magnetic field gradient probe. After 30 mg of a polymer sample was charged into a 5 mm sample tube and was completely dissolved in 0.6 ml of 1,1,2,2-tetrachloroethane-$d_2$, integration was performed 24 times or more under conditions of 135° C., a flip angle of 45° C., and a pulse interval of 10 seconds.

For the $^{13}$C-NMR of the polymer, there was used Inova 600 ($^{13}$C observation frequency: 150 MHz) manufactured by Varian Co. fitted with a 10 mmϕ Z magnetic field gradient probe. After 50 mg of a polymer sample was charged into a 5 mm sample tube and was completely dissolved in 0.6 ml of 1,1,2,2-tetrachloroethane-$d_2$, integration was performed 500 times or more under conditions of 135° C., a flip angle of 45° C., proton complete decoupling, and a pulse interval of 5 seconds.

(4) Measurement of Physical Properties

Physical properties (elongation at break, strength at break, elastic recovery rate) of the polymer obtained in the invention are determined by evaluating molded articles of the obtained polymer. The properties were determined under the following Condition-1 for Examples 1 to 7.

(Condition-1)

A polymer sample was hot-pressed at 200° C. and allowed to cool to room temperature, thereby forming a film. This film was cut out into a dog-bone shape having a thickness of about 0.5 mm, a length of 7.5 mm, and a width of 2.0 mm, which was used as a sample for measuring the physical properties (hereinafter sometimes referred to simply as sample).

A test of mechanical properties was performed using an Instron 1123 tester.

The following two methods were applied to the test.

(i) Elongation at Break and Strength at Break

The sample was monotonically extended at a rate of 5.08 mm/min (0.01 sec$^{-1}$) until it was broken, and elongation and strength at break were recorded.

(ii) Elastic Recovery Rate

After the sample was extended at the same rate as in (i) until a predetermined strain, the crosshead direction was reversed and the sample was shrunk until stress became zero. After the stress reached zero, the crosshead direction was again reversed and an elongation longer than before was achieved at the same crosshead rate. This stepwise elongation cycle was repeated until the sample was broken or the sample was drawn out of the grip.

For the strength at break and the elongation at break, results of the test (i) were employed. Moreover, for the recovery rate, recovery from 300% elongation in (ii) was recorded.

(Condition-2)

Owing to the optimization of conditions associated with an improvement in the experimental scale, for Examples 8 to 11 and Comparative Examples 1 to 5, the test of physical properties was performed under the following Condition-2.

(Preparation of Sheet)

About 5 g of a sample was pressed at 190° C. at 5 MPa for about 3 minutes to prepare a sheet having a thickness of about 0.5 mm. This was cut with a dumbbell-shape No. 8-type punching blade described in JIS K6251 (a method for tensile test of vulcanized rubber) to prepare a test piece.

(Test of Physical Properties)

STA-1225 manufactured by Orientec Co., Ltd. was used as a measuring instrument. The distance between chucks were set at 20 mm and the sample was extended until it was broken monotonically at a rate of 15 mm/min and the elongation and strength at break were recorded.

Moreover, after the sample was extended to 300% elongation (=60 mm) at the same rate, the crosshead direction was reversed and the sample was shrunk until stress became zero at the same rate. The elongation at the time when the stress reached zero was recorded and the elastic recovery rate was calculated from the residual elongation.

(5) Density Measurement

The density of the polymer obtained in the invention was measured at 23° C. by the water displacement method using an electronic densimeter ("SD-200L" manufactured by Alpha Mirage Co., Ltd.).

(6) Measurement of Melting Point and Glass Transition Point

Using DSC ("Diamond DSC" manufactured by Perkin Elmer, Inc.), they were determined by the measurement under conditions of isotherm at 20° C. for 1 minute, temperature elevation from 20 to 210° C. at 10° C./min, isotherm at 210° C. for 5 minutes, temperature lowering from 210 to -70° C. at 10° C./min, isotherm at -70° C. for 5 minutes, and then temperature elevation from -70 to 210° C. at 10° C./min.

Manufacture Example 1

Synthesis of rac-dimethylsilylenebis(2-(2-(5-methyl)-furyl)-4-phenyl-indenyl)hafnium dichloride (hereinafter "Complex M1")

Complex M1 was synthesized according to the method described in Manufacture Example M-1 of WO2008/059969.

Manufacture Example 2

Synthesis of rac-dimethylsilylenebis(2-(2-(5-methyl)-furyl)-4-phenyl-indenyl)zirconium dichloride (hereinafter "Complex M2")

Complex M2 was synthesized according to the method described in Manufacture Example 1 of WO2004/02259.

Manufacture Example 3

Process for Manufacturing Isotactic Polypropylene Macromonomer (Macromonomer A)

Purified hexane (500 ml) and 10 ml of a heptane solution of a modified methylaluminoxane (Al concentration: 1.47 mol/L) were introduced into an inductive stirring autoclave having an inner volume of 1 with a built-in stirring blade, which had been substituted with purified nitrogen. The reactor was heated to 70° C., the mixture was saturated with propylene at 0.6 MPa, a heptane solution of Complex M1 (4.0 μmol) obtained in Manufacture Example 1 was injected with high-pressure argon into the reaction vessel, and thus polymerization was started. After 60 minutes, when propylene pressure was dropped to 0.4 MPa, propylene was released to terminate the reaction. The obtained polymer was collected by filtration and dried under reduced pressure until a constant weight was attained to obtain 28 g of a polymer (macromonomer A). The number-average molecular weight on the basis of the end vinyl groups as measured by $^1$H-NMR was 12,200 and the isotactic pentad ratio [mmmm] as measured by $^{13}$C-NMR was 0.92. Moreover, $T_m$ as measured by DSC was 141.7° C. Table 1 shows the physical property values of the obtained isotactic polypropylene macromonomer.

Manufacture Example 4

Manufacture of Isotactic Polypropylene Macromonomer (Macromonomer B)

Purified hexane (500 ml) and 3 ml of a heptane solution of a modified methylaluminoxane (Al concentration: 1.47 mol/L) were introduced into an inductive stirring autoclave having an inner volume of 1 with a built-in stirring blade, which had been substituted with purified nitrogen. The reaction vessel was heated to 70° C., the mixture was saturated with propylene at 0.2 MPa, a heptane solution of Complex M2 (1.0 μmol) obtained in Manufacture Example 2 was pumped with high-pressure argon into the reaction vessel, and thus polymerization was started. During the reaction, the pressure of the reaction vessel was kept at 0.2 MPa by additionally adding propylene. After 60 minutes, propylene was released to terminate the reaction. A polymer was collected by filtration and dried under reduced pressure until a constant weight was attained to obtain 34 g of a polymer (macromonomer B). The number-average molecular weight on the basis of the end vinyl groups as measured by $^1$H-NMR was 26,900 and the isotactic pentad ratio [mmmm] as measured by $^{13}$C-NMR was 0.97. Moreover, $T_m$ as measured by DSC was 146.3° C. Table 1 shows the physical property values of the obtained isotactic polypropylene macromonomer.

TABLE 1

| Sample name (macromonomer) | Catalyst | Number-average molecular weight Mn | Melting point Tm (° C.) | Isotactic pentad ratio mmmm (%) |
| --- | --- | --- | --- | --- |
| Manufacture Example 3 | A | M1 | 12,200 | 141.7 | 0.92 |
| Manufacture Example 4 | B | M2 | 26,900 | 146.3 | 0.97 |

Manufacture Example 5

Synthesis of [bis[2,4-di-tert-butyl-6-[[(3,5-difluorophenyl)imino]methyl]phenolato]titanium dichloride (hereinafter "Complex M3")

Complex M3 was synthesized by the method described in Cherian, A. E. et al. Macromolecules 2005, 38, 6268. The following formula (X) shows the structural formula of Complex M3.

[Chem 9]

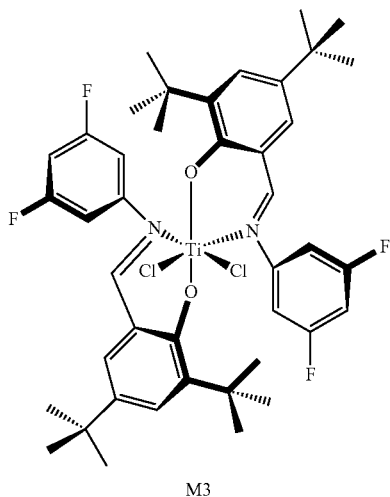

M3

Manufacture Example 6

Synthesis of [bis[2,4-di-tert-butyl-6-[[(3,5-dichlorophenyl)imino]methyl]phenolato]titanium dichloride (hereinafter "Complex M4")

Complex M4 was synthesized by the method described in Cherian, A. E. et al. Macromolecules 2005, 38, 6268. The following formula (Y) shows the structural formula of Complex M4.

[Chem 10]

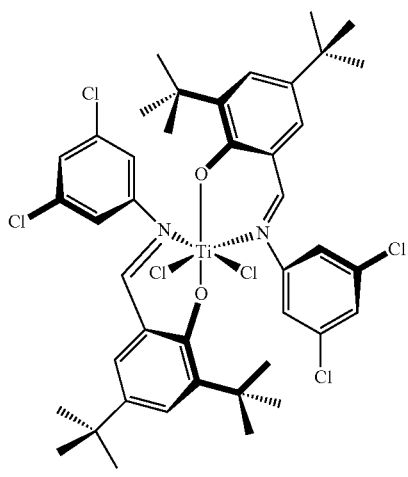

M4

Manufacture Example 7

Synthesis of [bis[2-trimethylsilyl-6-[[(3,5-difluorophenyl)imino]methyl]phenolato]titanium dichloride (hereinafter "Complex M5")

Complex M5 was synthesized by the method described in Cherian, A. E. et al. Macromolecules 2005, 38, 6268. The following formula (Z) shows the structural formula of Complex M5.

[Chem 11]

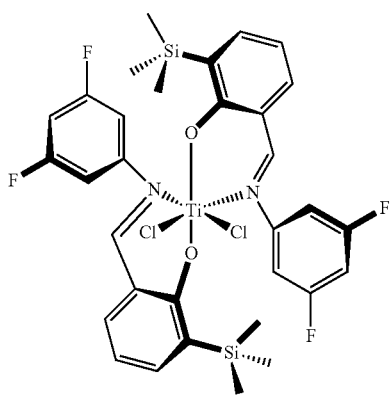

M5

Manufacture Example 8

Manufacture of Syndiotactic Polypropylene Macromonomer (Macromonomer C)

After a 6-ounce glass reactor fitted with a magnetic stirring bar (Andrew Glass manufactured by Lab Crest Co.) was dried at 130° C. overnight, it was allowed to cool under vacuum. Under nitrogen, dry methylaluminoxane and dry toluene (140 ml) were introduced. The reactor was cooled to 0° C. on an ice bath. At this point, the inside of the reactor was substituted with propylene three times and thereafter the solution was saturated with propylene at 30 psi. Complex M3 (50 μmol) was dissolved in toluene (10 ml) and introduced into the reactor using a gas-tight syringe, and thus polymerization was started. After 6 hours, methanol was introduced to terminate the reaction. The gas in the reactor was released and the reaction solution was poured into a methanol/hydrochloric acid solution to precipitate a polymer. The polymer collected by filtration was further washed with methanol and dried under reduced pressure until a constant weight was attained. There was obtained 3.1 g of a polymer (macromonomer C). The number-average molecular weight on the basis of the end vinyl groups as measured by $^1$H-NMR was 5,000 and the syndiotactic pentad ratio [rrrr] as measured by $^{13}$C-NMR was 0.80. Moreover, $T_m$ as measured by DSC was 113.4° C. Table 2 shows the physical property values of the obtained syndiotactic polypropylene macromonomer.

Manufacture Example 9

Manufacture of Syndiotactic Polypropylene Macromonomer (Macromonomer D)

The same operations as in Manufacture Example 6 were conducted except that Complex M4 was used, thereby obtaining 4.0 g of a polymer (macromonomer D). The number-average molecular weight on the basis of the end vinyl groups as measured by $^1$H-NMR was 4,000 and the syndiotactic pentad ratio [rrrr] as measured by $^{13}$C-NMR was 0.67. Moreover, $T_m$ as measured by DSC was 87.4° C. Table 2 shows the physical property values of the obtained syndiotactic polypropylene macromonomer.

Manufacture Example 10

Manufacture of Syndiotactic Polypropylene Macromonomer (Macromonomer E)

The same operations as in Manufacture Example 6 were conducted except that Complex M5 was used, thereby obtaining 4.0 g of a polymer (macromonomer E). The number-average molecular weight on the basis of the end vinyl groups as measured by $^1$H-NMR was 7,600 and the syndiotactic pentad ratio [rrrr] as measured by $^{13}$C-NMR was 0.94. Moreover, $T_m$ as measured by DSC was 145.8° C. Table 2 shows the physical property values of the obtained syndiotactic polypropylene macromonomer.

TABLE 2

| Sample name (macro-monomer) | Catalyst | Number-average molecular weight Mn | Melting point Tm (° C.) | Syndiotactic pentad ratio rrrr (%) |
|---|---|---|---|---|
| Manufacture Example 8 | C | M3 | 5,000 | 113.4 | 0.80 |
| Manufacture Example 9 | D | M4 | 4,000 | 87.4 | 0.67 |
| Manufacture Example 10 | E | M5 | 7,600 | 145.8 | 0.94 |

Manufacture Example 11

Synthesis of [(N-2,6-diisopropylphenylamido)dimethyl(α-naphthalene-2-diyl(6-pyridine-2-diyl)methane))hafnium dimethyl (Complex C1)

Complex C1 was synthesized according to the method described in Working Example 4 of WO2008/112133. The following formula (W1) shows the structural formula of Complex C1.

[Chem 12]

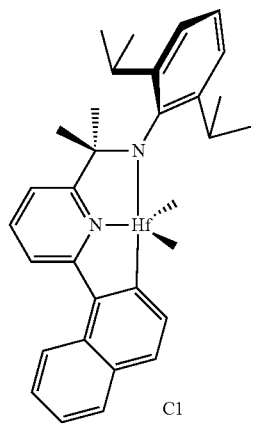

(W1)

C1

Example 1

Manufacture of Ethylene/Propylene Copolymer Having Isotactic Polypropylene Branch After a 6-ounce glass reactor (Andrew Glass manufactured by Lab Crest Co.) fitted with a magnetic stirring bar was dried at 130° C. overnight, it was allowed to cool under vacuum. Under nitrogen, the propylene macromonomer A (0.20 g) obtained in Manufacture Example 3, a 1:1 mixture (10 µmol) of triisobutylaluminum/butylhydroxytoluene, and dry toluene (45 ml) were introduced.

The reactor was heated to 100° C. and the whole was stirred for 10 minutes. Thereafter, the reactor was cooled to 70° C. At this point, the inside of the reactor was substituted with propylene three times and thereafter the solution was saturated with propylene at 6 psi. Then, the reactor was pressurized with ethylene at 30 psi and the solution was saturated. Complex C1 (5.0 µmol) and tris(pentafluorophenyl)boran (5.3 µmol) were dissolved in toluene (5.0 ml) and introduced into the reactor using a gas-tight syringe, and thus polymerization was started.

During the reaction, the pressure of the reactor was kept at 30 psi by additionally adding ethylene. After 15 minutes, methanol was introduced to terminate the reaction. The gas in the reactor was released and the reaction solution was poured into methanol to precipitate a polymer. The polymer collected by filtration was further washed with methanol and dried under reduced pressure until a constant weight was attained to obtain 2.2 g of a polymer. GPC measurement was conducted for the obtained polymer and the number-average molecular weight of the product excluding the polypropylene macromonomer A was determined. Table 3 shows the results.

Example 2

Manufacture of Ethylene/Propylene Copolymer Having Isotactic Polypropylene Branch The same operations as in Example 1 were conducted except that the polymer (macromonomer B) obtained in Manufacture Example 4 was used as a macromonomer, thereby obtaining 2.4 g of a polymer, and the number-average molecular weight was measured.

Example 3

Manufacture of Ethylene/1-Octene Copolymer Having Isotactic Polypropylene Branch After a 6-ounce glass reactor (Andrew Glass manufactured by Lab Crest Co.) fitted with a magnetic stirring bar was dried at 130° C. overnight, it was allowed to cool under vacuum. Under nitrogen, 1-octene (2.0 ml), the propylene macromonomer (macromonomer A) (0.40 g) obtained in Manufacture Example 3, a 1:1 mixture (10 μmol) of triisobutylaluminium/butylhydroxytoluene, and dry toluene (45 ml) were introduced. The reactor was heated to 100° C. and the whole was stirred for 10 minutes. Thereafter, the reactor was cooled to 70° C. At this point, the inside of the reactor was substituted with ethylene three times and thereafter the solution was saturated with ethylene at 15 psi. Complex C1 (5.0 μmol) and tris(pentafluorophenyl)boran (5.3 μmol were dissolved in toluene (5.0 ml) and introduced into the reactor using a gas-tight syringe, and thus polymerization was started. During the reaction, the pressure of the reactor was kept at 15 psi by additionally adding ethylene. After a desired period of time, methanol was introduced to terminate the reaction. The gas in the reactor was released and the reaction solution was poured into methanol to precipitate a polymer. The polymer collected by filtration was further washed with methanol and dried under reduced pressure until a constant weight was attained to obtain 2.7 g of a polymer. For the obtained polymer, the number-average molecular weight was measured as in Example 1.

Example 4

Manufacture of Ethylene/Propylene Copolymer Having Syndiotactic Polypropylene Branch After a 6-ounce LabCrest (registered trademark) glass reactor (Andrew Glass) fitted with a magnetic stirring bar was dried at 130° C. overnight, it was allowed to cool under vacuum. Under nitrogen, the propylene macromonomer (0.20 g) obtained in Manufacture Example 8, a 1:1 mixture (10 μmol) of triisobutylaluminum/butylhydroxytoluene, and dry toluene (45 ml) were introduced. The reactor was heated to 70° C. and the whole was stirred for 10 minutes. During the time, the inside of the reactor was substituted with propylene three times and thereafter the solution was saturated with propylene at 6 psi. Then, the reactor was pressurized with ethylene at 30 psi to saturate the solution. Complex C1 (5.0 μmol) and tris(pentafluorophenyl)boran (5.3 μmol) were dissolved in toluene (5.0 ml) and introduced into the reactor using a gas-tight syringe, and thus polymerization was started. During the reaction, the pressure of the reactor was kept at 30 psi by additionally adding ethylene. After 15 minutes, methanol was introduced to terminate the reaction. The gas in the reactor was released and the reaction solution was poured into methanol to precipitate a polymer. The polymer collected by filtration was further washed with methanol and dried under reduced pressure until a constant weight was attained to obtain 2.3 g of a polymer. For the obtained polymer, the number-average molecular weight was measured as in Example 1.

Example 5

Manufacture of Ethylene/Propylene Copolymer Having Isotactic Polypropylene Branch The same operations as in Example 4 were conducted except that the polymer obtained in Manufacture Example 9 was used as a macromonomer, thereby obtaining 1.8 g of a polymer, and the number-average molecular weight was measured.

Example 6

Manufacture of Ethylene/Propylene Copolymer Having Isotactic Polypropylene Branch The same operations as in Example 4 were conducted except that the polymer obtained in Manufacture Example 10 was used as a macromonomer, thereby obtaining 1.6 g of a polymer, and the number-average molecular weight was measured.

Example 7

Manufacture of Ethylene/1-Octene Copolymer Having Syndiotactic Polypropylene Branch After a 6-ounce LabCrest® glass reactor (Andrew Glass) fitted with a magnetic stirring bar was dried at 130° C. overnight, it was allowed to cool under vacuum. Under nitrogen, the propylene macromonomer obtained in Manufacture Example 10, 1-octene (2.0 ml), a 1:1 mixture (10 μmol) of triisobutylaluminum/butylhydroxytoluene, and dry toluene (50 ml) were introduced. The reactor was heated to 70° C. and the whole was stirred for 10 minutes. At this point, the inside of the reactor was substituted with ethylene three times and thereafter the solution was saturated with ethylene at 15 psi. Complex C1 (5 μmol) and trispentafluorophenylboran (5.3 μmol) were dissolved in toluene (5.0 ml) and introduced into the reactor using a gas-tight syringe, and thus polymerization was started. During the reaction, the pressure of the reactor was kept at 15 psi by additionally adding ethylene. After a desired period of time, methanol was introduced to terminate the reaction. The gas in the reactor was released and the reaction solution was poured into methanol to precipitate a polymer. The polymer collected by filtration was further washed with methanol and dried under reduced pressure until a constant weight was attained to obtain 1.9 g of a polymer. For the obtained polymer, the number-average molecular weight was measured as in Example 1.

Table 3 shows the physical properties and mechanical properties of the thermoplastic elastomer compositions manufactured in Examples 1 to 7.

Incidentally, the "macromonomer content" in Table 3 represents the weight percentage of the macromonomer charged during the polymerization relative to weight of the resulting composition, and the "melting point" and "glass transition point" represent the physical property values of the obtained elastomeric composition.

TABLE 3

| | Main chain component | α-Olefin content (in main chain) (mol %) | Side chain (macromonomer) | Macromonomer content (% by weight) | Number-average molecular weight Mn | Melting point Tm (° C.) | Glass transition point Tg (° C.) | Elongation at break (%) | Strength at break (MPa) | Elastic recovery rate (%) |
|---|---|---|---|---|---|---|---|---|---|---|
| Example 1 | Ethylene/Propylene | 35 | A (Manufacture Example 3) | 9.2 | 280,000 | 144 | −60 | 1600 | 3.4 | 75 |
| Example 2 | Ethylene/Propylene | 34 | B (Manufacture Example 4) | 8.8 | 224,000 | 155 | −60 | 1200 | 4.7 | 75 |
| Example 3 | Ethylene/1-Octene | 24 | A (Manufacture Example 3) | 15 | 352,000 | 141 | −67 | 950 | 4.5 | 84 |
| Example 4 | Ethylene/Propylene | 33 | C (Manufacture Example 8) | 8.2 | 246,000 | 128 | −58 | 1300 | 4 | 88 |
| Example 5 | Ethylene/Propylene | 38 | D (Manufacture Example 9) | 8.3 | 209,000 | 84 | −59 | 2500 | 3 | 86 |
| Example 6 | Ethylene/Propylene | 34 | E (Manufacture Example 10) | 12.5 | 371,000 | 138 | −59 | 1350 | 6.2 | 88 |
| Example 7 | Ethylene/1-Octene | 26 | E (Manufacture Example 10) | 10.8 | 392,000 | 121 | −65 | 1900 | 5 | 90 |

As shown in Table 3, any polymer obtained by copolymerizing the macromonomer exhibits excellent elongation at break, strength at break, and elastic recovery rate. Surprisingly, the compositions obtained by copolymerizing the syndiotactic polypropylene macromonomer exhibits particularly excellent elastic recovery rate, suggesting that they have more excellent performance as a hard segment.

Example 8

Scale-Up of Example 7 and Density Measurement

Into an inductive stirring autoclave having an inner volume of 2 with a built-in stirring blade, which had been substituted with purified nitrogen, the propylene macromonomer (4.0 g) obtained in Manufacture Example 10, 1-octene (20 ml), a 1:1 mixture (100 μmol) of triisobutylaluminum/butylhydroxytoluene, and dry toluene (500 ml) were introduced. After the reactor was heated to 70° C. and the whole was stirred for 15 minutes, it was cooled to 35° C. Complex C1 (50 μmol) and trispentafluorophenylboran (50 μmol) were dissolved in toluene (6.0 ml) and introduced into a catalyst feeder fitted with a rupture disk. After the reactor was again heated to 70° C., the catalyst was introduced with ethylene pressure and thus polymerization was started. During the reaction, the pressure of the reactor was kept at 0.20 MPa by additionally adding ethylene. After a desired period of time, ethanol was introduced to terminate the reaction. The gas in the reactor was released and the reaction solution was poured into ethanol to precipitate a polymer. The polymer collected by filtration was further washed with ethanol and dried under reduced pressure until a constant weight was attained to obtain 31.5 g of a polymer. When the density of the polymer was measured, it was 0.861 g/ml.

Example 9

Scale-Up of Example 6 and Density Measurement

Into an inductive stirring autoclave having an inner volume of 2 with a built-in stirring blade, which had been substituted with purified nitrogen, the propylene macromonomer (4.0 g) obtained in Manufacture Example 10, a 1:1 mixture (100 μmol) of triisobutylaluminum/butylhydroxytoluene, and dry toluene (500 ml) were introduced. After the reactor was heated to 70° C. and the whole was stirred for 15 minutes, it was cooled to 35° C. Complex C1 (50 μmol) and trispentafluorophenylboran (50 μmol) were dissolved in toluene (6.0 ml) and introduced into a catalyst feeder fitted with a rupture disk. After the reactor was again heated to 70° C. and a mixed gas of propylene and ethylene (propylene/ethylene=45/55, molar ratio) was introduced into the polymerization vessel until 0.30 MPa, the catalyst was introduced with purified nitrogen and thus polymerization was started. During the reaction, the pressure of the reactor was kept at 0.40 MPa by additionally adding the mixed gas. After a desired period of time, ethanol was introduced to terminate the reaction. The gas in the reactor was released and the reaction solution was poured into ethanol to precipitate a polymer. The polymer collected by filtration was further washed with ethanol and dried under reduced pressure until a constant weight was attained to obtain 28.2 g of a polymer. When the density of the polymer was measured, it was 0.861 g/ml.

Example 10

Into an inductive stirring autoclave having an inner volume of 2 with a built-in stirring blade, which had been substituted with purified nitrogen, the propylene macromonomer (4.0 g) obtained in Manufacture Example 10, a 1:1 mixture (100 μmol) of triisobutylaluminum/butylhydroxytoluene, and dry toluene (500 ml) were introduced. After the reactor was heated to 70° C. and the whole was stirred for 15 minutes, it was cooled to 35° C. Complex C1 (50 μmol) and trispentafluorophenylboran (50 μmol) were dissolved in toluene (6.0 ml) and introduced into a catalyst feeder fitted with a rupture disk. After 42 ml of propylene was introduced into the polymerization vessel and ethylene was further introduced into the polymerization vessel until 0.30 MPa, the reactor was again heated to 70° C., the catalyst was introduced with ethylene pressure, and thus polymerization was started. During the reaction, the pressure of the reactor was kept at 0.40 MPa by additionally adding ethylene. After a desired period of time, ethanol was introduced to terminate the reaction. The gas in the reactor was released and the reaction solution was poured into ethanol to precipitate a polymer. The polymer collected by filtration was further washed with ethanol and dried under reduced pressure until a constant weight was attained to obtain 21.3 g of a polymer.

Example 11

Polymerization was performed in the same manner as in Example 8 except that 1-hexene was used as α-olefin instead of 1-octene, thereby obtaining 16.3 g of a polymer.

Manufacture Example 11

Process for Manufacturing Dimethylsilyl(Tetramethylcyclopentadienyl)(Cyclododecyl-Amido)Titanium Dimethyl (Complex C2

Complex C2 was synthesized according to the method described in Example UT of U.S. Pat. No. 6,265,338.

Comparative Example 1

Into an inductive stirring autoclave having an inner volume of 2 with a built-in stirring blade, which had been substituted with purified nitrogen, the propylene macromonomer (4.0 g) obtained in Manufacture Example 10, a modified methylaluminoxane (Tosoh Finechem Corporation "MMAO-3A" 2.1 mmol [Al equivalent atom]), and dry toluene (1,000 ml) were introduced. After the reactor was heated to 70° C. and the whole was stirred for 15 minutes, it was cooled to 35° C. Complex C2 (5 μmol) was dissolved in toluene (5 ml) and introduced into a catalyst feeder fitted with a rupture disk. After 150 ml of propylene was introduced into the polymerization vessel, the reactor was heated to 60° C., the catalyst was introduced, and thus polymerization was started. After a desired period of time, ethanol was introduced to terminate the reaction. The gas in the reactor was released and the reaction solution was poured into ethanol to precipitate a polymer. The polymer collected by filtration was further washed with ethanol and dried under reduced pressure until a constant weight was attained to obtain 59.6 g of a polymer.

Comparative Example 2

Into an inductive stirring autoclave having an inner volume of 2 with a built-in stirring blade, which had been substituted with purified nitrogen, the propylene macromonomer (4.0 g) obtained in Manufacture Example 10, a modified methylaluminoxane (Tosoh Finechem Corporation "MMAO-3A" 2.1 mmol [Al equivalent atom]), and dry toluene (1,000 ml) were introduced. After the reactor was heated to 70° C. and the whole was stirred for 15 minutes, it was cooled to 35° C. Complex C2 (2.5 μmol) was dissolved in toluene (2.5 ml) and introduced into a catalyst feeder fitted with a rupture disk. After ethylene was introduced into the polymerization vessel until 0.4 MPa and 150 ml of propylene was then introduced into the polymerization vessel, the reactor was heated to 60° C., the catalyst was introduced, and thus polymerization was started. After a desired period of time, ethanol was introduced to terminate the reaction. The gas in the reactor was released and the reaction solution was poured into ethanol to precipitate a polymer. The polymer collected by filtration was further washed with ethanol and dried under reduced pressure until a constant weight was attained to obtain 34.1 g of the polymer.

Manufacture Example 12

Process for manufacturing rac-dimethylsilylenebis [2-(5-methyl-2-furyl)-4-(4-isopropylphenyl)indenyl) hafnium dichloride (Complex M6

Complex M6 was synthesized according to the method described in Example 11 of JP-A-2009-299045.

Manufacture Example 13

Process for Manufacturing Isotactic Polypropylene Macromonomer

Into a 5 separable flask fitted with a stirring blade and a refluxing device, 1,698 g of pure water was charged and 501 g of 98% sulfuric acid was added dropwise. Thereto was further added 300 g of commercially available granulated montmorillonite (manufactured by Mizusawa Industrial Chemicals, Ltd., Benclay SL, average particle diameter: 19.5 μm), and then the whole was stirred. Thereafter, they were reacted at 90° C. for 2 hours. The slurry was washed on an apparatus in which an aspirator was connected to Nutsche and a suction bottle. An aqueous solution of 324 g of lithium sulfate monohydrate dissolved in 900 ml of water was added to the collected cake, followed by reaction at 90° C. for 2 hours. The slurry was washed until pH>4 on an apparatus in which an aspirator was connected to Nutsche and a suction bottle. The collected cake was dried at 120° C. overnight. As a result, 275 g of chemically processed montmorillonite was obtained.

The chemically processed montmorillonite obtained above was weighed in an amount of 509 mg into a flask having an inner volume of 50 ml. Under purified nitrogen, 2.0 ml of a toluene solution of triisobutylethylaluminum (0.5 mmol/ml) was added and, after reaction at room temperature for 30 minutes, the whole was washed twice with 20 ml of toluene.

To the washed montmorillonite, 5.1 ml of a mixed toluene solution containing triisobutylaluminum (30 μmol/ml) and Complex M6 (3.0 μmol/ml) synthesized in Manufacture Example 12 was added, followed by stirring at room temperature for 1 hour.

Into an inductive stirring autoclave having an inner volume of 2 with a built-in stirring blade, which had been substituted with purified nitrogen, was introduced 625 g of liquefied propylene into which 1 ml of a toluene solution (0.5 mol/L) of triisobutylaluminum had been introduced. Thereafter, 200 mg of the above catalyst slurry was pressed therein and temperature was elevated to 70° C., thus initiating polymerization. After 1 hour, propylene was purged to terminate the polymerization. When a polymer yield was weighed, 359 g of polypropylene was obtained.

The number-average molecular weight on the basis of the end vinyl groups as measured by $^1$H-NMR was 77.8 kg/mol and the isotactic pentad ratio [mmmm] as measured by $^{13}$C-NMR was 0.90. Moreover, Tm as measured by DSC was 155.9° C.

Manufacture Example 14

Process for Manufacturing Polyethylene Macromonomer

Into an inductive stirring autoclave having an inner volume of 2 with a built-in stirring blade, which had been substituted with purified nitrogen, purified toluene (500 ml) and 0.25 ml of a toluene solution of methylaluminoxane (Al concentration: 2.6 mol/L) were introduced. On the other hand, a toluene solution of dicyclopentadienylzirconium dichloride (purchased from Aldrich Co., 27.4 μmol) was introduced into a catalyst feeder fitted with a rupture disk. After the reaction vessel was heated to 90° C. and ethylene was introduced until 0.2 MPa, the catalyst was pressed into the reaction vessel with ethylene pressure and thus polymerization was started. During the reaction, the pressure of the reactor was kept at 0.2 MPa by additionally adding ethylene. After 20 minutes, ethanol was introduced to terminate the reaction. A polymer was collected by filtration and dried under reduced pressure until a constant weight was attained to obtain 43 g of the polymer. The number-average molecular weight on the basis of the end vinyl groups as measured by $^1$H-NMR was 14.0 kg/mol. Moreover, Tm as measured by DSC was 133.2° C.

Comparative Example 3

Into an inductive stirring autoclave having an inner volume of 2 with a built-in stirring blade, which had been substituted with purified nitrogen, the polypropylene macromonomer (4.0 g) obtained in Manufacture Example 13, a 1:1 mixture (100 μmol) of triisobutylaluminum/butylhydroxytoluene, and dry toluene (500 ml) were introduced. After the reactor was heated to 100° C. and the whole was stirred for 15 minutes, it was cooled to 35° C. Complex C1 (33 μmol) and trispentafluorophenylboran (35 μmol) were dissolved in toluene (6.0 ml) and introduced into a catalyst feeder fitted with a rupture disk. After 30 ml of propylene was introduced into the polymerization vessel, the reactor was heated to 70° C., and ethylene was introduced into the polymerization vessel until 0.30 MPa, the catalyst was introduced with ethylene pressure and thus polymerization was started. During the reaction, the pressure of the reactor was kept at 0.40 MPa by additionally adding ethylene. After a desired period of time, ethanol was introduced to terminate the reaction. The gas in the reactor was released and the reaction solution was poured into ethanol to precipitate a polymer. The polymer collected by filtration was further washed with ethanol and dried under reduced pressure until a constant weight was attained to obtain 31.2 g of a polymer.

When molecular weight measurement was tried by GPC, it was difficult to discriminate between the crystalline polypropylene macromonomer and the ethylene/α-olefin copolymer component containing the branched olefin copolymer component in the composition, so that the number-average molecular weight of the entire composition was described as Mn in the present example.

Comparative Example 4

Polymerization was performed in the same manner as in Comparative Example 3 except that the polyethylene macromonomer manufactured in Manufacture Example 14 was used as a macromonomer instead of the propylene macromonomer, thereby obtaining 32.4 g of a polymer.

Comparative Example 5

Into an inductive stirring autoclave having an inner volume of 2 with a built-in stirring blade, which had been substituted with purified nitrogen, the polyethylene macromonomer (4.0 g) obtained in Manufacture Example 14, a 1:1 mixture (100 μmol) of triisobutylaluminum/butylhydroxytoluene, and dry toluene (500 ml) were introduced. After the reactor was heated to 100° C. and the whole was stirred for 15 minutes, it was cooled to 35° C. 1-Hexene (20 ml) was introduced into the autoclave. On the other hand, Complex C1 (33 μmol) and trispentafluorophenylboran (35 μmol) were dissolved in toluene (6.0 ml) and introduced into a catalyst feeder fitted with a rupture disk. After the reactor was heated to 70° C. and ethylene was introduced into the polymerization vessel until 0.10 MPa, the catalyst was introduced with ethylene pressure and thus polymerization was started. During the reaction, the pressure of the reactor was kept at 0.20 MPa by additionally adding ethylene. After a desired period of time, ethanol was introduced to terminate the reaction. The gas in the reactor was released and the reaction solution was poured into ethanol to precipitate a polymer. The polymer collected by filtration was further washed with ethanol and dried under reduced pressure until a constant weight was attained to obtain 26.5 g of a polymer.

Table 4 shows the physical properties and mechanical properties of the compositions manufactured in Examples 8 to 11 and Comparative Examples 1 to 5.

TABLE 4

| | Main chain component | α-Olefin content (in main chain) (mol %) | Side chain macromonomer | Macromonomer content (% by weight) | Mn | Tm (° C.) | Tg (° C.) | Elongation at break (%) | Strength at break (MPa) | Elastic recovery rate (%) |
|---|---|---|---|---|---|---|---|---|---|---|
| Example 8 | Ethylene/1-Octene | 22 | E (Manufacture Example 10) | 12.7 | 336,000 | 115 | −50 | 1200 | 6.4 | 87 |
| Example 9 | Ethylene/Propylene | 42 | E (Manufacture Example 10) | 14.1 | 229,000 | 130 | −57 | 950 | 4.1 | 90 |
| Example 10 | Ethylene/Propylene | 48 | E (Manufacture Example 10) | 18.8 | 401,000 | 132 | −58 | 800 | 3.2 | 90 |
| Example 11 | Ethylene/1-Hexene | 27 | E (Manufacture Example 10) | 17.1 | 385,000 | 123 | −59 | 1900 | 25 | 88 |
| Comparative Example 1 | Propylene | 100 | E (Manufacture Example 10) | 6.9 | 209,000 | 136 | −6 | 2100 | 0.2 | 92 |
| Comparative Example 2 | Propylene/Ethylene | 91 | E (Manufacture Example 10) | 11.8 | 538,000 | 132 | −17 | 1400 | 0.2 | 91 |
| Comparative Example 3 | Ethylene/Propylene | 45 | F (Manufacture Example 13) | 12.7 | 165,000 | 154 | −60 | 2400 | 2.3 | 66 |
| Comparative Example 4 | Ethylene/Propylene | 47 | G (Manufacture Example 14) | 12.3 | 237,000 | 125 | −60 | 270 | 1.3 | Impossible to measure |
| Comparative Example 5 | Ethylene/1-Hexene | 27 | G (Manufacture Example 14) | 15.0 | 338,000 | 128 | −53 | 1850 | 7.6 | 63 |

As shown in Table 4, the compositions manufactured in Examples 8 to 11 all exhibited excellent elastomer properties.

On the other hand, the compositions manufactured in Comparative Examples 1 and 2 exhibit excellent elongation at break and elastic recovery rate but glass transition temperature is high, so that impact resistance at low temperature is not expectable, which is one of the fundamental performance required for an elastomer. Moreover, the compositions exhibited a behavior that strength at break became extremely low. This point will be further considered with reference to a stress-strain curve.

Figure 2:
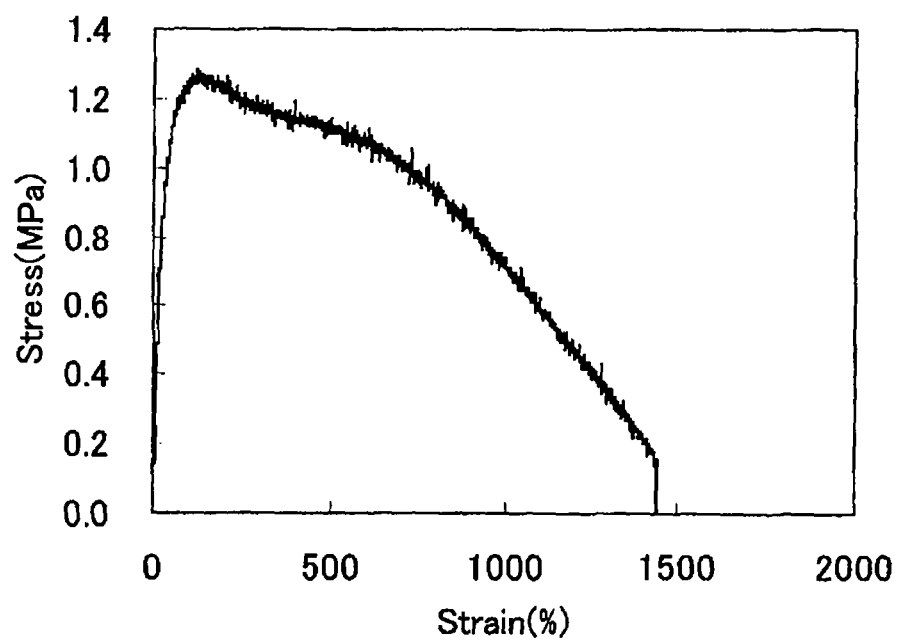
FIG. 2 is a result of measuring a stress-strain curve of Comparative Example 2.

FIG. 1 and FIG. 2 show stress-strain curves of Example 9 and Comparative Example 2, respectively.

In Example 9, a strong rise of stress is observed until the breaking point. Thus, it is realized that crystalline polypropylene side chains introduced into the main chain exert strong interaction (crystallization associated with extension) on one another and behave as physical crosslinking points between the polymer molecules and thereby high elastomer performance is exhibited.

On the other hand, in Comparative Example 2, after an initial rise, a rise of stress is hardly observed until the breaking point and thus it is realized that the polymer undergoes plastic deformation. From this fact, the high elastic recovery rate and the high elongation at break in a low stress region in Comparative Example 2 are attributable to interaction of entanglement of molecules of the atactic polypropylene itself that is the main chain and it is obvious that the effect of the crystalline polypropylene side chain is not exhibited. In this case, it is considered that affinity between the main chain and the side chain increases and inhibits the crystallization between the side chains owing to the high α-olefin content in the main chain. Namely, in order to enhance the interaction between the crystalline polypropylene side chains one another to exhibit the function as physical crosslinking points, it is extremely important that the compositional ratio of the main chain falls within the range disclosed in the invention.

The composition manufactured in Comparative Example 3 exhibits excellent elongation at break but the elastic recovery rate is poor, so that it cannot be said that the composition is an excellent elastomer.

In Comparative Example 4, the elongation at break was very low and the polymer was broken in the measurement of the elastic recovery rate, so that it was difficult to measure the elastic recovery rate.

The composition manufactured in Comparative Example 5 exhibits excellent elongation at break but the elastic recovery rate is poor, so that it cannot be said that the composition is an excellent elastomer. On the other hand, the composition manufactured in Example 11 exhibited very high elastic recovery rate. Since the composition of Example 11 has crystalline polypropylene side chains instead of crystalline ethylene side chains while the composition has the same ethylene/1-hexene main chain as in Comparative Example 5, it can be said that the crystalline polypropylene side chains are especially excellent as physical crosslinking points as compared with the crystalline ethylene side chains.

From the above, it is realized that the compositions disclosed in the invention exhibit particularly excellent performance as thermoplastic elastomers.

While the invention has been described in detail and with reference to specific embodiments thereof, it will be apparent to one skilled in the art that various changes and modifications can be made therein without departing from the spirit and scope thereof. The present application is based on Japanese Patent Application No. 2011-233247 filed on Oct. 24, 2011, and the contents are incorporated herein by reference.

INDUSTRIAL APPLICABILITY

According to the present invention, it becomes possible to provide a thermoplastic elastomer having excellent mechanical properties such as heat resistance, elongation at break and elastic recovery rate by an economical process.

The invention claimed is:

1. A thermoplastic elastomer composition which comprises a branched olefin copolymer comprising: a main chain of an ethylene/α-olefin copolymer; and a side chain derived from a crystalline propylene polymer containing a vinyl group at one end, wherein the content of α-olefin in the main chain is 70 mol % or less, the composition has an elongation at break of 500% or higher, and has an elastic recovery rate of 70% or more when recovering from an extension to 300% elongation.

2. The thermoplastic elastomer composition according to claim 1, wherein the crystalline propylene polymer has an isotactic pentad ratio of 0.80 or higher.

3. The thermoplastic elastomer composition according to claim 1, wherein the crystalline propylene polymer has a syndiotactic pentad ratio of 0.60 or higher.

4. The thermoplastic elastomer composition according to claim 1, wherein the crystalline propylene polymer has a number-average molecular weight of 50,000 or less.

5. The thermoplastic elastomer composition according to claim 1, which has a glass transition point of −30° C. or lower.

6. The thermoplastic elastomer composition according to claim 1, which has a density of 0.880 g/ml or less.

7. The thermoplastic elastomer composition according to claim 1, wherein
   A) the crystalline propylene polymer has an isotactic pentad ratio of 0.80 or higher;
   B) the crystalline propylene polymer has a number-average molecular weight of 50,000 or less;
   C) the thermoplastic elastomer composition has a glass transition point of −30° C. or lower; and
   D) the thermoplastic elastomer composition has a density of 0.880 g/ml or less.

8. The thermoplastic elastomer composition according to claim 7, wherein the crystalline propylene polymer has an isotactic pentad ratio of 0.90 or higher.

9. The thermoplastic elastomer composition according to claim 1, wherein
   A) the crystalline propylene polymer has a syndiotactic pentad ratio of 0.60 or higher;
   B) the crystalline propylene polymer has a number-average molecular weight of 50,000 or less;
   C) the thermoplastic elastomer composition has a glass transition point of −30° C. or lower; and
   D) the thermoplastic elastomer composition has a density of 0.880 g/ml or less.

10. The thermoplastic elastomer composition according to claim 9, wherein the crystalline propylene polymer has a syndiotactic pentad ratio of 0.70 or higher.

11. The thermoplastic elastomer composition according to claim 1, wherein the total content of the crystalline propylene polymer and component(s) derived from the crystalline propylene polymer, is 30% by weight or less in the thermoplastic elastomer composition.

12. A process for manufacturing a thermoplastic elastomer composition comprising a branched olefin copolymer comprising: a main chain of an ethylene/α-olefin copolymer; and a side chain derived from a crystalline propylene polymer containing a vinyl group at one end and having a number-average molecular weight of 50,000 or less, wherein the process comprises: mixing components (a) to (c) below; and coordination polymerizing the components (a) to (c) below in the presence of a transition metal catalyst so that the main chain may have the α-olefin (c) content of 5 to 70 mol %,
- (a) a crystalline propylene polymer containing a vinyl group at one end, and having an isotactic pentad ratio of 0.80 or higher and a number-average molecular weight of 50,000 or less,
- (b) ethylene, and
- (c) at least one kind of α-olefin having 3 to 20 carbon atoms.

13. A process for manufacturing a thermoplastic elastomer composition comprising a branched olefin copolymer comprising: a main chain of an ethylene/α-olefin copolymer; and a side chain derived from a crystalline propylene polymer containing a vinyl group at one end and having a number-average molecular weight of 50,000 or less, wherein the process comprises: mixing components (a) to (c) below; and coordination polymerizing the components (a) to (c) below in the presence of a transition metal catalyst so that the main chain may have the α-olefin (c) content of 5 to 70 mol %,
- (a) a crystalline propylene polymer containing a vinyl group at one end, and having a syndiotactic pentad ratio of 0.60 or higher and a number-average molecular weight of 50,000 or less,
- (b) ethylene, and
- (c) at least one kind of α-olefin having 3 to 20 carbon atoms.

14. The process for manufacturing a thermoplastic elastomer composition according to claim 12, wherein the transition metal catalyst is a complex represented by general formula (VIII):

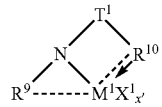

(VIII)

wherein $R^9$ is a hydrocarbon group having 1 to 30 carbon atoms, $T^1$ is a divalent group having 1 to 30 atoms excluding a hydrogen atom, $R^{10}$ is a heteroaryl group having 5 to 20 carbon atoms and having a Lewis base functionality, which may have a substituent, $M^1$ is a metal of Group 4 in the periodic table, $X^1$ is an anionic, neutral or dianionic ligand group, x' is an integer of 0 to 5 denoting the number of $X^1$ groups, $R^{10}$ and $M^1$ may bind to each other to form a ring, and the solid lines, broken lines and arrow in the formula represent a bond, an arbitrary bond and a coordinate bond, respectively.

15. The process for manufacturing a thermoplastic elastomer composition according to claim 12, wherein the mixing step is carried out so that the content of the component (a) is 30% by weight or less based on the total content of the components (a) to (c).

16. The process for manufacturing a thermoplastic elastomer composition according to claim 12, wherein the polymerization is carried out so that the total amount of the crystalline propylene polymer and component(s) derived from the crystalline propylene polymer, is 30% by weight or less in the thermoplastic elastomer composition.

17. A thermoplastic elastomer composition manufactured by the method according to claim 12.

\* \* \* \* \*

UNITED STATES PATENT AND TRADEMARK OFFICE
CERTIFICATE OF CORRECTION

PATENT NO. : 9,139,679 B2  Page 1 of 1
APPLICATION NO. : 14/260794
DATED : September 22, 2015
INVENTOR(S) : Hisashi Ohtaki et al.

It is certified that error appears in the above-identified patent and that said Letters Patent is hereby corrected as shown below:

On the title page, Item (71), the Applicants' Information is incorrect. Item (71) should read:

--(71) Applicants: MITSUBISHI CHEMICAL CORPORATION, Chiyoda-ku (JP);
CORNELL UNIVERSITY, Ithaca, NY (US)--

Signed and Sealed this
Fifteenth Day of March, 2016

Michelle K. Lee
*Director of the United States Patent and Trademark Office*